United States Patent
Wu et al.

(10) Patent No.: US 11,543,695 B2
(45) Date of Patent: Jan. 3, 2023

(54) LIGHT-ADJUSTING GLASS, MANUFACTURING METHOD THEREOF AND GLASS ASSEMBLY

(71) Applicants: Beijing BOE Optoelectronics Technology Co., Ltd., Beijing (CN); BOE TECHNOLOGY GROUP CO., LTD., Beijing (CN)

(72) Inventors: Xiaojuan Wu, Beijing (CN); Xiaoqiang Zhang, Beijing (CN); Zhiqiang Zhao, Beijing (CN); Wei Zhao, Beijing (CN); Chunlei Wang, Beijing (CN); Hongliang Yuan, Beijing (CN); Jian Wang, Beijing (CN); Jing Yu, Beijing (CN)

(73) Assignees: Beijing BOE Optoelectronics Technology Co., Ltd., Beijing (CN); BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 17/211,978

(22) Filed: Mar. 25, 2021

(65) Prior Publication Data
US 2022/0066246 A1 Mar. 3, 2022

(30) Foreign Application Priority Data

Aug. 28, 2020 (CN) .......................... 202010886736.9

(51) Int. Cl.
*G02F 1/1334* (2006.01)
*G02F 1/1339* (2006.01)
(Continued)

(52) U.S. Cl.
CPC .......... *G02F 1/1334* (2013.01); *G02F 1/1339* (2013.01); *G02F 1/1343* (2013.01); *G02F 1/13737* (2013.01)

(58) Field of Classification Search
CPC ............... G02F 1/1334; G02F 1/13345; G02F 1/13737; G02F 2202/04
See application file for complete search history.

(56) References Cited

U.S. PATENT DOCUMENTS

| 11,029,551 B2 * | 6/2021 | Yoshida | G02F 1/133365 |
| 2013/0258252 A1 * | 10/2013 | Hsieh | G02F 1/13737 445/24 |
| 2016/0026026 A1 * | 1/2016 | Kim | G02F 1/13725 349/123 |

FOREIGN PATENT DOCUMENTS

CN 107085327 A * 8/2017 ........... G02F 1/1334

* cited by examiner

*Primary Examiner* — Jia X Pan
(74) *Attorney, Agent, or Firm* — Houtteman Law LLC

(57) ABSTRACT

The present disclosure provides a light-adjusting glass and a manufacturing method thereof, and a glass assembly, and belongs to the field of display glass technology. The light-adjusting glass of the present disclosure includes at least one light-adjusting module; the light-adjusting module includes a first substrate and a second substrate opposite to each other, and a dye liquid crystal layer between the first substrate and the second substrate; wherein liquid crystal molecules in the dye liquid crystal layer deflect under a control of an electric field between the first substrate and the second substrate, to control a transmittance of light; wherein the dye liquid crystal layer includes a polymer network, which is configured such that when the electric field between the first substrate and the second substrate changes, twisting degrees of the liquid crystal molecules are identical, and twisting degrees of dye molecules are identical.

20 Claims, 16 Drawing Sheets

(51) Int. Cl.
*G02F 1/1343* (2006.01)
*G02F 1/137* (2006.01)

IRG651

IRG369

IRG184

IRG819

DGEBF

PACM

EGDE

EDBEA

LIGHT-ADJUSTING GLASS, MANUFACTURING METHOD THEREOF AND GLASS ASSEMBLY

CROSS REFERENCE TO RELATED APPLICATIONS

The present application claims the priority of the Chinese Patent Application No. 202010886736.9 filed on Aug. 28, 2020, the content of which is incorporated herein by reference in its entirety.

TECHNICAL FIELD

The present disclosure relates to the field of display glass technology, in particular to a light-adjusting glass, a method for manufacturing the light-adjusting glass and a glass assembly.

BACKGROUND

At present, the light-adjusting glass is used more and more extensively in the fields of building and traffic, and existing customers of automobiles, high-speed rails, passenger planes and the like are interested in a dye liquid crystal light-adjusting glass. Products such as PDLC smart glass, electrochromic smart glass and the like exist in an existing smart glass market. The PDLC (polymer dispersed liquid crystal) smart glass may only realize a switching between transparency and haze, and does not block light or insulate heat; the electrochromic smart glass has the problems of a complex film forming process, a long response time (8 to 20 s), bluish light in a dark state and the like. The dye liquid crystal light-adjusting glass realizes a switching between a bright state and a dark state by utilizing a selective absorption of dichroic dye molecules in liquid crystals to light, and greatly improves optical properties such as black state purity, short response time and the like compared with the existing PDLC smart glass and the electrochromic smart glass. However, the existing dye liquid crystal light-adjusting glass may only realize an adjustment of a black state, a bright state and a gray scale state, that is, only may adjust the transmittance of the glass to visible light. When the light-adjusting glass is used for vehicle windows, meeting room partitions and building glass, the light-adjusting glass is required to have privacy protection while transmitting light; in the fields of vehicle windows, art design and the like, the whole-surface color light-adjusting glass has a great application prospect. Current light-adjusting glass does not meet these requirements.

SUMMARY

The present disclosure provides a light-adjusting glass, a manufacturing method for the light-adjusting glass and a glass assembly.

In a first aspect, an embodiment of the present disclosure provides a light-adjusting glass including at least one light-adjusting module; the light-adjusting module includes a first substrate and a second substrate opposite to each other, and a dye liquid crystal layer between the first substrate and the second substrate; wherein the dye liquid crystal layer is overturned under a control of an electric field between the first substrate and the second substrate, so as to control a transmittance of light; wherein the dye liquid crystal layer includes a polymer network, which is configured such that when the electric field between the first substrate and the second substrate changes, twisting degrees of liquid crystal molecules in the dye liquid crystal layer are the same, and twisting degrees of dye molecules are the same.

In one embodiment, the light-adjusting glass is in a normally black mode, and the dye liquid crystal layer further includes positive liquid crystal molecules; polymerizable monomers of the polymer network are along a plane perpendicular to the first substrate.

In one embodiment, the light-adjusting glass is in a normally white mode, the dye liquid crystal layer further includes negative liquid crystal molecules; polymerizable monomers of the polymer network are in a planar spiral.

In one embodiment, the light-adjusting glass includes a plurality of light-adjusting modules, wherein the dye liquid crystal layer further includes chiral additives.

In one embodiment, a mass ratio of the chiral additives in the dye liquid crystal layer is 0.2% to 10%.

In one embodiment, a polymerizable monomer of the polymer network includes a photo-polymerizable monomer or a thermally polymerizable monomer.

In one embodiment, the photo-polymerizable monomer includes an acrylic monomer; the thermally polymerizable monomer includes an epoxy-based monomer.

In one embodiment, a mass ratio of polymerizable monomers of the polymer network in the dye liquid crystal layer is 1% to 40%.

In one embodiment, the light-adjusting glass includes a plurality of light-adjusting modules, which are stacked together.

In one embodiment, the first substrate includes a first base, a first electrode on a side of the first base proximal to the dye liquid crystal layer; the second substrate includes a second base and a second electrode on a side of the second base proximal to the dye liquid crystal layer; wherein, the first electrode and the second electrode are both plate-shaped electrodes.

In one embodiment, the first substrate includes a first base, a first electrode on a side of the first base proximal to the dye liquid crystal layer; the second substrate includes a second base and a second electrode on a side of the second base proximal to the dye liquid crystal layer; wherein, one of the first electrode and the second electrode is a plate-shaped electrode, and the other is a strip-shaped electrode.

In one embodiment, the dye liquid crystal layer further includes dye molecules and chiral additives; the polymer network includes a photo-polymerizable monomer or a thermally polymerizable monomer; a mass ratio of the chiral additives in the dye liquid crystal layer is 0.2% to 10%; and a mass ratio of polymerizable monomers of the polymer network in the dye liquid crystal layer is 1% to 40%.

In one embodiment, the dye liquid crystal layer further includes dye molecules and chiral additives; the polymer network includes a photo-polymerizable monomer or a thermally polymerizable monomer; a mass ratio of the chiral additives in the dye liquid crystal layer is 0.2% to 10%; and a mass ratio of polymerizable monomers of the polymer network in the dye liquid crystal layer is 1% to 40%.

In a second aspect, an embodiment of the present disclosure provides a glass assembly, which includes the above-mentioned light control glass.

In a third aspect, an embodiment of the present disclosure further provides a method of manufacturing the light-adjusting glass in the normally black mode, including steps of: uniformly mixing the positive liquid crystal molecules, the dye molecules, chiral additives, the polymerizable monomers and initiators to form a dye liquid crystal mixture;

forming a first electrode on a first base, forming a first alignment layer on a surface of the first electrode distal to the first base, to form the first substrate; forming a second electrode on a second base, forming a second alignment layer on a surface of the second electrode distal to the second base to form the second substrate; dripping the dye liquid crystal mixture on one of the first substrate and the second substrate, coating a sealant on the other one, and aligning and assembling the first substrate and the second substrate to form a dye liquid crystal cell; curing the sealant to adhere the first substrate and the second substrate, while ensuring that the polymerizable monomers in the dye liquid crystal mixture do not react; applying a voltage to the first electrode and the second electrode to cause the liquid crystal molecules and the dye molecules to be arranged in the plane perpendicular to the first substrate, while the polymerizable monomers are arranged in the plane perpendicular to the first substrate under an induction of the liquid crystal molecules and the dye molecules; performing a polymerization on the dye liquid crystal cell, such that the polymerizable monomers in the dye liquid crystal mixture react to form the polymer network, such that the polymer network is a vertical polymer network arranged parallel to the liquid crystal molecules; and removing the voltage applied on the first electrode and the second electrode, such that the liquid crystal molecules and the dye molecules are restored to a planar spiral arrangement, and the polymer network is still presented in a vertical structure, so as to manufacture the light-adjusting glass in the normally black mode with the vertical polymer network.

In one embodiment, the step of curing the sealant to adhere the first substrate and the second substrate, while ensuring that the polymerizable monomers in the dye liquid crystal mixture do not react includes steps of: curing the sealant to adhere the first substrate and the second substrate by performing a thermal polymerization process, or by using a light shielding part to shield light the polymerizable monomers and then performing a photopolymerization process, wherein the polymerizable monomers are the photopolymerizable monomers, and curing the sealant to adhere the first substrate and the second substrate by performing the photopolymerization process, wherein the polymerizable monomers are the thermally polymerizable monomers.

In one embodiment, the step of uniformly mixing the positive liquid crystal molecules, the dye molecules, chiral additives, the polymerizable monomers and initiators to form a dye liquid crystal mixture includes steps of: uniformly mixing dye liquid crystal molecules MDA-18-1670, chiral additives ZLI-4571, polymerizable monomers C3M and photoinitiators IRG184 according to a mass ratio of 91.9%/1.5%/6%/0.6%, to form the dye liquid crystal mixture; or uniformly mixing the dye liquid crystal molecules MDA-18-1670, chiral additives BPH, polymerizable monomers DGEBF and polymerizable monomers PACM according to a mass ratio of 89.5%/0.5%/5%/5%, to form the dye liquid crystal mixture.

The present disclosure also provides a method of manufacturing the light-adjusting glass the normally white mode, including steps of: uniformly mixing the negative liquid crystal molecules, the dye molecules, chiral additives, the polymerizable monomers and initiators to form a dye liquid crystal mixture; forming a first electrode on a first base, forming a first alignment layer on a surface of the first electrode distal to the first base, to form the first substrate; forming a second electrode on a second base, forming a second alignment layer on a surface of the second electrode distal to the second base to form the second substrate; dripping the dye liquid crystal mixture on one of the first substrate and the second substrate, coating a sealant on the other one, and aligning and assembling the first substrate and the second substrate to form a dye liquid crystal cell; curing the sealant to adhere the first substrate and the second substrate, while ensuring that the polymerizable monomers in the dye liquid crystal mixture do not react; applying a voltage to the first electrode and the second electrode to cause the liquid crystal molecules and the dye molecules to be arranged parallel to a surface of the first substrate and be spirally aligned along a spiral axis perpendicular to the surface of the first substrate under an action of the chiral additives to form the polymer network with a uniform planar spiral texture; and removing the voltage applied on the first electrode and the second electrode, such that the liquid crystal molecules and the dye molecules are restored to be arranged perpendicular to the first substrate, and the polymer network is still presented in a planar spiral structure, so as to manufacture the light-adjusting glass in the normally white mode with the planar spiral polymer network.

In one embodiment, the step of curing the sealant to adhere the first substrate and the second substrate, while ensuring that the polymerizable monomers in the dye liquid crystal mixture do not react includes steps of: curing the sealant to adhere the first substrate and the second substrate by performing a thermal polymerization process, or by using a light shielding part to shield light the polymerizable monomers and then performing a photopolymerization process, wherein the polymerizable monomers are the photopolymerizable monomers, and curing the sealant to adhere the first substrate and the second substrate by performing the photopolymerization process, wherein the polymerizable monomers are the thermally polymerizable monomers.

In one embodiment, the step of uniformly mixing the negative liquid crystal molecules, the dye molecules, chiral additives, the polymerizable monomers and initiators to form a dye liquid crystal mixture includes steps of: uniformly mixing dye liquid crystal molecules MDA-18-2219, chiral additives CB15, polymerizable monomers C6M, polymerizable monomers DCM and photoinitiators IRG651 according to a mass ratio of 87.5/1.5%/3%/7%/1.0%, to form the dye liquid crystal mixture.

Reference numbers: 1. a first base; 2. a first electrode; 3. a first alignment layer; 4. liquid crystal molecules; 5. dye molecules; 6. chiral additives; 7. a second alignment layer; 8. a second electrode; 9. a second base; 10. a polymerizable network; 11. a polymerizable monomer.

DETAIL DESCRIPTION OF EMBODIMENTS

In order to make one of ordinary skill in the art understand the technical solutions of the present disclosure better, the present disclosure is described below in detail with reference to the accompanying drawings and the specific embodiments.

Unless defined otherwise, technical or scientific terms used herein shall have ordinary meanings as understood by one of ordinary skill in the art to which the present disclosure belongs. The use of "first," "second," and the like in the present disclosure is not intended to indicate any order, quantity, or importance, but rather is used to distinguish one element from another. Also, the use of the words "a," "an," or "the" and the like do not indicate a limitation for the number of items, but rather indicate the presence of at least one item. The word "comprising", "comprises", "including" or "includes" and the like means that an element or item preceding the word includes an element or item listed after the word and its equivalent, but does not exclude other elements or items. The word "connected" or "coupled" and the like is not limited to physical or mechanical connections, but may include electrical connections, regardless of direct or indirect. The words "upper", "lower", "left", "right" and the like are used only to indicate relative positional relationships among objects, and when an absolute position of a described object is changed, the relative positional relationships may be changed accordingly.

Figure 1:
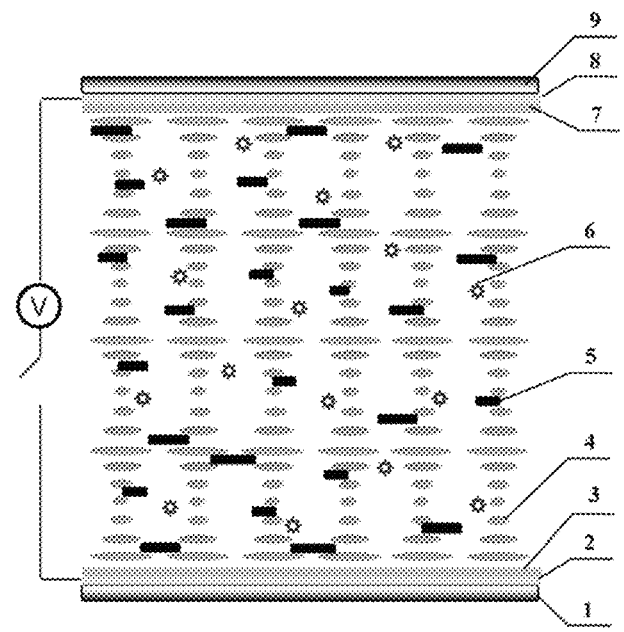
FIG. 1 is a schematic cross-sectional view of an exemplary light-adjusting glass in a normally black mode when being not energized in the related art.
Figure 2:
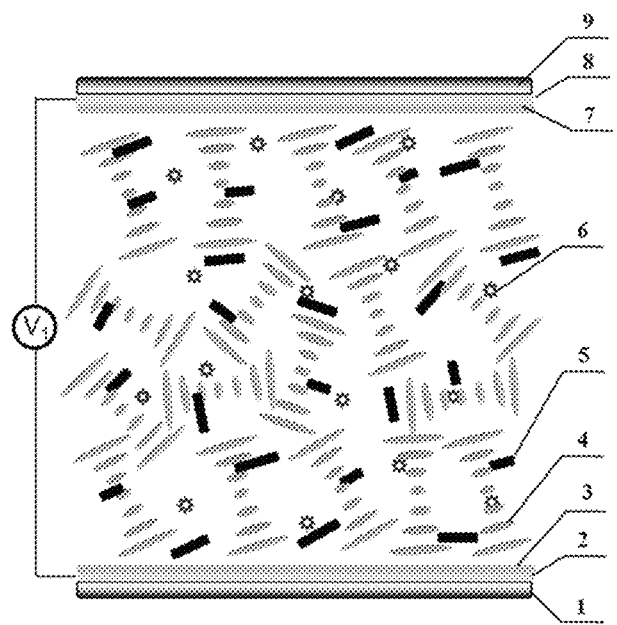
FIG. 2 is a cross-sectional view of the light-adjusting glass of FIG. 1 with a small first voltage V1 applied to first and second electrodes thereof.
Figure 3:
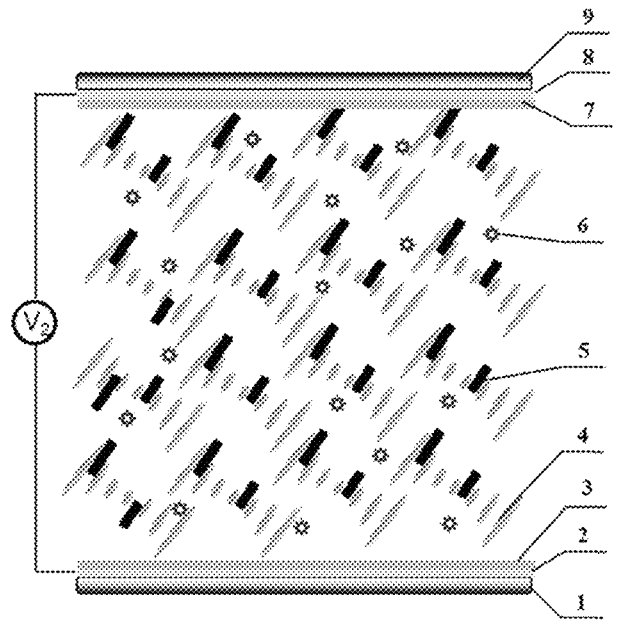
FIG. 3 is a cross-sectional view of the light-adjusting glass of FIG. 1 with a second voltage V2 applied to the first and second electrodes.
Figure 4:
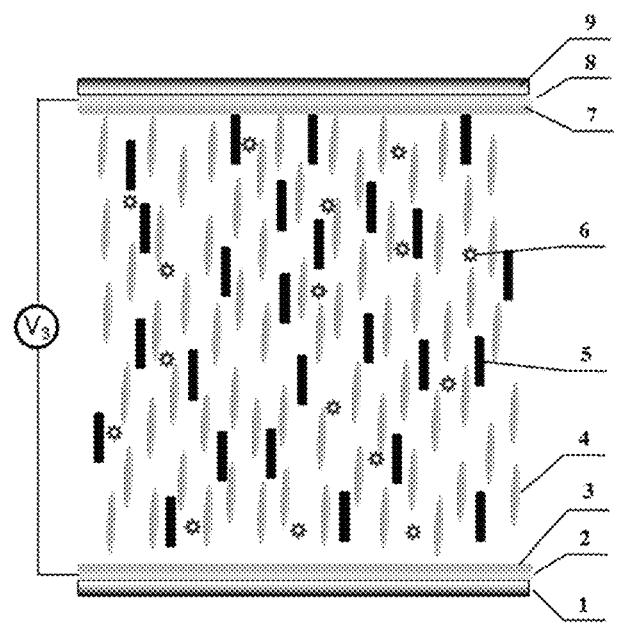
FIG. 4 is a cross-sectional view of the light-adjusting glass of FIG. 1 with a higher third voltage V3 applied to the first and second electrodes.

FIG. 1 is a schematic cross-sectional view of an exemplary light-adjusting glass in a normally black mode when being not energized in the related art. As shown in FIG. 1, the light-adjusting glass includes a first substrate, a second substrate and a dye liquid crystal layer arranged between the first substrate and the second substrate, wherein the first substrate includes a first base 1, and a first electrode 2 and a first alignment layer 3 which are sequentially arranged on a side of the first base 1 proximal to the dye liquid crystal layer; the second substrate includes: a second base 9, and a second electrode 8 and a second alignment layer 7 which are sequentially arranged on a side of the second base proximal to the dye liquid crystal layer; the dye liquid crystal layer includes positive liquid crystal molecules 4, dye molecules 5 (such as dichroic dyes) and chiral additives 6. When the first electrode 2 and the second electrode 8 are not energized, due to the effect of the first alignment layer 3, the second alignment layer 7 and chiral molecules in the chiral additives 6, the liquid crystal molecules 4 are spirally arranged along a spiral axis perpendicular to the first substrate (the second substrate) in a planar texture, and simultaneously the dye molecules 5 are induced to be spirally arranged in a plane parallel to a surface of the first substrate, so as to absorb incident light in all directions, thereby realizing a dark state, as shown in FIG. 1. In order to reduce a transmittance of the light-adjusting glass in the dark state and therefore achieve a better dark state, generally, the content of the chiral additives 6 in the dye liquid crystal layer is higher, so when a smaller first voltage V1 is applied to the first electrode 2 and the second electrode 8, a spiral twisting force of the chiral additives 6 and an electric field force between the first electrode 2 and the second electrode 8 conflict with each other, so that the spiral structure formed by the liquid crystal molecules 4 rotates in each direction, i.e. the spiral axis rotates in each direction, to form a metastable state similar to a focal conic texture, and the dye molecules in corresponding different regions have different rotation degrees, as shown in FIG. 2, resulting in different light absorption amounts, i.e. different transmittances, of the dye molecules 6 in different regions, so that Mura defects are generated. When a high second voltage V2 is applied to the first electrode 2 and the second electrode 8, the action of the electric field force on the liquid crystal molecules 4 is increased, so as to promote the spiral structure formed by the liquid crystal molecules 4 to rotate along a pre-tilt angle in a direction under a binding action, i.e. in a preferred manner, a uniform arrangement for the spiral structure may be formed in the whole region, and the rotation degrees of the dye molecules in the corresponding different regions are the same, as shown in FIG. 3. When the voltages applied to the first electrode and the second electrode are continuously increased to a third voltage V3, the electric field force is continuously increased, until the liquid crystal molecules are uncoiled to form a homeotropic state, that is, the liquid crystal molecules are arranged perpendicular to the substrate, and the induced dye molecules 5 are arranged perpendicular to the substrate, so that the light absorbance is minimum, that is, the transmittance is highest, and the light-adjusting glass is in a bright state, as shown in FIG. 4.

The inventors have found that when a small voltage is applied to the first electrode 2 and the second electrode 8, for the light-adjusting glass in the normally black mode, a nonuniform transmittance, i.e., the Mura defect, exists, such that a gray scale light adjustment cannot be achieved. When the voltage is rapidly removed from a high level, the electric field force disappears instantly, the liquid crystal molecules 4 form the metastable state similar to the focal conic texture under the action of the spiral twisting force of the chiral additives 6, such that the nonuniform transmittance occurs, and the requirements of the gray scale light adjustment and randomly switching among different gray scales cannot be met.

Figure 5:
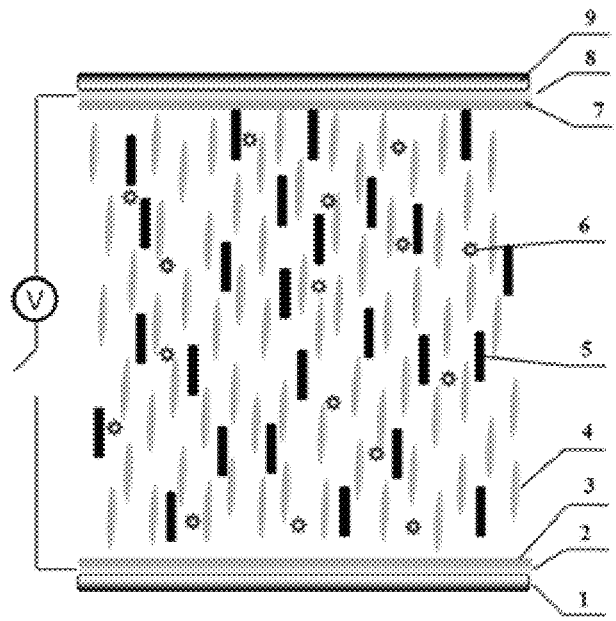
FIG. 5 is a schematic cross-sectional view of an exemplary light-adjusting glass in a normally white mode when being not energized in the related art.
Figure 6:
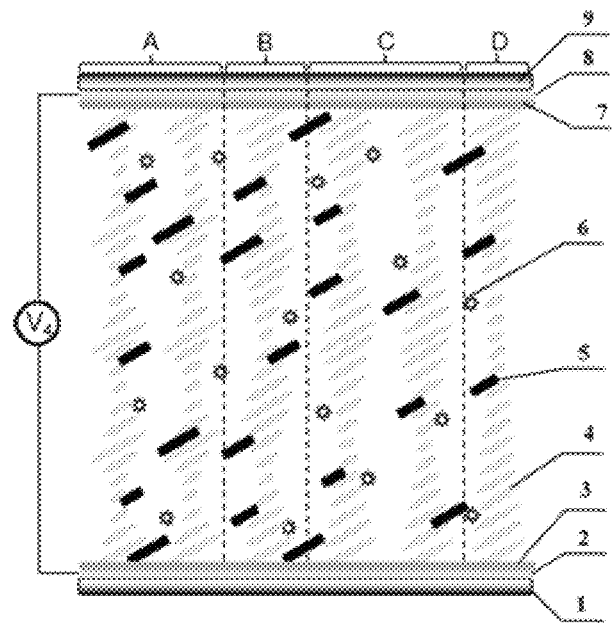
FIG. 6 is a cross-sectional view of the light-adjusting glass of FIG. 5 with a small fourth voltage V4 applied to first and second electrodes thereof.
Figure 7:
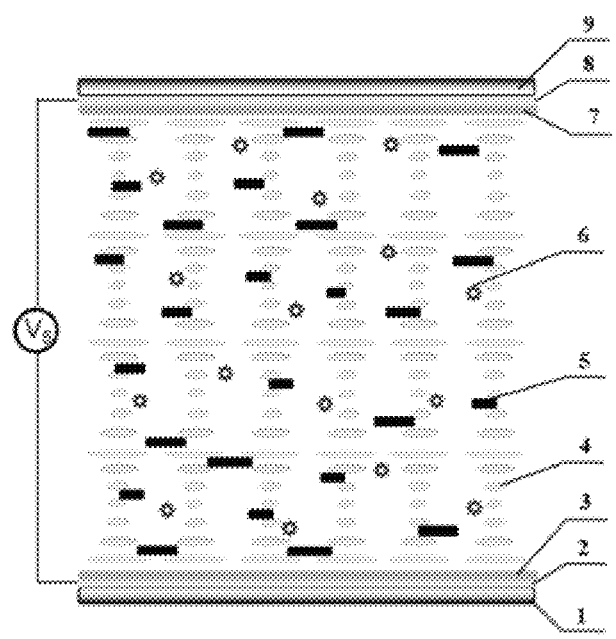
FIG. 7 is a cross-sectional view of the light-adjusting glass of FIG. 5 with a higher fifth voltage V5 applied to the first and second electrodes.

FIG. 5 is a schematic cross-sectional view of an exemplary light-adjusting glass in a normally white mode when being not energized in the related art. As shown in FIG. 5, the light-adjusting glass has a structure substantially similar to that of the light-adjusting glass in the normally black mode, and also includes a first substrate, a second substrate, and a dye liquid crystal layer disposed between the first substrate and the second substrate. The difference between the light-adjusting glass in the normally black mode and the light-adjusting glass in the normally white mode is that the liquid crystal molecules 4 in the dye liquid crystal layer in the light-adjusting glass in the normally white mode are negative liquid crystal molecules. When the first electrode 2 and the second electrode 8 are not energized, due to the action of the first alignment layer 3, the second alignment layer 7 and the chiral molecules in the chiral additives 6, the liquid crystal molecules 4 are arranged perpendicular to the first substrate (the second substrate), the dye molecules 5 are induced to be arranged perpendicular to the first substrate, a long axis of the dye molecules 5 is parallel to an incident direction, such that the incident light is not substantially absorbed, and a uniform bright state is presented. When the content of the chiral additives 6 in the dye liquid crystal layer is high, a small fourth voltage V4 is applied to the first electrode 2 and the second electrode 8, the spiral twisting force of the chiral additives 6 is dominant, and simultaneously, due to the action of an electric field force between the first electrode 2 and the second electrode 8, spiral degrees formed by liquid crystals in different regions are different. As shown in FIG. 6, the light-adjusting glass is divided into A, B, C, D four regions, the spiral twisting degrees formed by liquid crystal molecules in the four regions are different. Specifically, for the spiral twisting degrees, A>B>C>D, the spiral degrees formed by correspondingly inducing the dye molecules 5 in each region are different, for the light absorbance in each region, A>B>C>D, for the transmittance, A<B<C<D, so that a nonuniform brightness and defects such as sandy Mura are generated. When a higher fifth voltage V5 is applied to the first electrode 2 and the second electrode 8, the electric field force increases, the liquid crystal molecules 4 tend to be arranged parallel to the surface of the first substrate, and at the same time, the spiral twisting force of the chiral additives 6 acts more strongly, so that the liquid crystal molecules 4 arranged parallel to the first substrate are arranged along the spiral axis perpendicular to the surface of the first substrate, and the electric field force and the spiral twisting force act simultaneously and are balanced with each other, such that the liquid crystal molecules 4 may rapidly form a uniform planar spiral texture arrangement, as shown in FIG. 7. The dye molecules 5 in each region are correspondingly induced to form a uniform spiral degree, so that the light absorbances of the regions are the same, and the dark state with uniform transmittance is realized. When the content of the chiral additives 6 in the dye liquid crystal layer is low, a small voltage is applied to the first electrode 2 and the second electrode 8, the spiral twisting force of the chiral additives 6 and the electric field force between the first electrode 2 and the second electrode 8 are small and balanced with each other, and a uniform spiral structure arrangement may be formed in the whole region. When a high voltage is applied to the first electrode 2 and the second electrode 8, the electric field force is greater than the spiral twisting force of the chiral additives 6, and after the voltage is applied, the liquid crystal molecules 4 are arranged parallel to the first substrate, but the chiral additives 6 cannot rapidly make the liquid crystal molecules 4 form a corresponding spiral state, and the spiral degrees in different regions are different, thereby generating defects such as sandy Mura.

The inventors have found that for the light-adjusting glass in the normally white mode, when the content of the chiral additives is high, and when a small voltage is applied to the first electrode and the second electrode, Mura defects due to nonuniform transmittance are likely to occur, that is, the gray scale light adjustment cannot be achieved. When the content of the chiral additives is low, and when a large voltage is applied to the first electrode and the second electrode, Mura defects due to nonuniform transmittance are likely to occur, adversely affecting the transmittance in the dark state, and reducing an adjustable range of the transmittance of products; neither of the above cases may satisfy the requirements for the gray scale light adjustment and a low transmittance in the dark state.

In view of the above problems, the following technical solutions are provided in the embodiments of the present disclosure.

In a first aspect, an embodiment of the present disclosure provides a light-adjusting glass, which includes a first substrate, a second substrate, and a dye liquid crystal layer disposed between the first substrate and the second substrate. The first substrate and the second substrate have the same structure as the first substrate and the second substrate as described above. Particularly, in the embodiment of the present disclosure, the dye liquid crystal layer includes not only liquid crystal molecules and dye molecules, but also a polymer network. The polymer network is formed by polymerization of polymerizable monomers. The polymer network is used for enabling the twisting degrees of liquid crystal molecules in the dye liquid crystal layer to be substantially the same, and enabling the twisting degrees of dye molecules in the dye liquid crystal layer to be substantially the same, when an electric field generated between the first substrate and the second substrate changes.

It should be noted that the "substantially the same" means completely the same, or substantially the same macroscopically.

Because the dye liquid crystal layer in the embodiment of the present disclosure includes the polymer network, the polymer network may, by means of anchoring effect thereof, enable the twisting degrees of liquid crystal molecules in the dye liquid crystal layer to be substantially the same, and enabling the twisting degrees of dye molecules in the dye liquid crystal layer to be substantially the same, when an electric field generated between the first substrate and the second substrate changes, that is, when the voltage applied on the first electrode and the second electrode changes, so as to avoid a disorder of an arrangement of a dye molecules due to a disorder of an arrangement of the liquid crystal molecules at different positions. Therefore, the transmittance of the light-adjusting glass in the embodiment of the present disclosure is uniform, avoiding the non-uniformity such as sandy Mura.

In some embodiments, the dye liquid crystal layer may further include chiral additives to improve the contrast of the light-adjusting glass. In the following description, a case will be described as an example where the dye liquid crystal layer includes chiral additives.

In order to describe the light-adjusting glass in the embodiments of the present disclosure more clearly, a case will be described as an example where the light-adjusting glass only includes one glass module, and the light-adjusting glass is in a normally black mode and a normally white mode, respectively.

Figure 8:
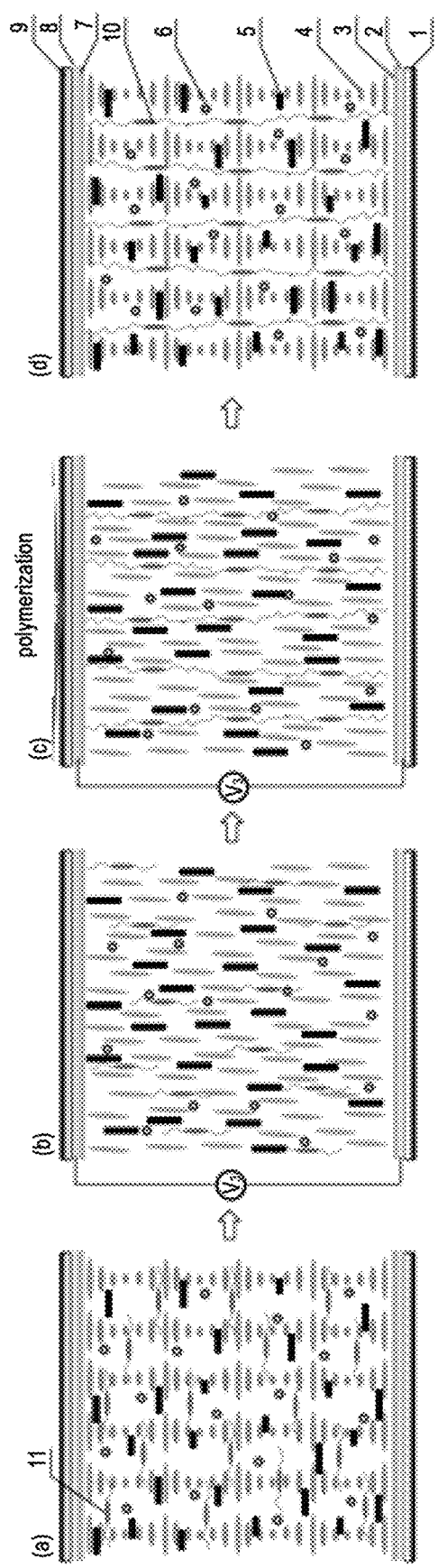
FIG. 8 is a schematic cross-sectional view of structures of a procedure for manufacturing a light-adjusting glass in a normally black mode according to an embodiment of the present disclosure.

In one example, the light-adjusting glass is in a normally black mode. The polymerizable monomers of the polymer network in the dye liquid crystal layer are arranged along a plane perpendicular to the first substrate (the second substrate). That is, the polymer network is a vertical polymer network. The light-adjusting glass having a single Cell dye liquid crystal in the normally black mode capable of realizing the gray scale light adjustment and randomly switching among different gray scales is manufactured by means of the induced anchoring effect of the polymer network. FIG. 8 is a schematic cross-sectional structural diagram of a process for manufacturing a light-adjusting glass in a normally black mode according to the embodiment of the present disclosure. Firstly, the first substrate and the second substrate are formed, a dye liquid crystal mixture, which is uniformly mixed according to a certain proportion and contains positive liquid crystal molecules, dye molecules, chiral additives, polymerizable monomers and initiators, is dripped on one of the first substrate and the second substrate, and a sealant (seal glue) is coated on the other of the first substrate and the second substrate, and the first substrate and the second substrate are then aligned and assembled, forming a dye liquid crystal cell, wherein the dye liquid crystal mixture forms a uniform planar spiral texture in the cell, as shown in FIG. 8 (*a*). Then, photopolymerization or thermal polymerization is performed on the dye liquid crystal cell, so that the first substrate and the second substrate are adhered by means of curing of the seal glue, while the polymerizable monomers in the dye liquid crystal mixture are ensured not to react; a high third voltage V3 is applied to the first substrate and the second substrate to cause the liquid crystal molecules and the dye molecules to be arranged in the plane perpendicular to the first substrate, while the polymerizable monomers are also arranged in the plane perpendicular to the first substrate under the induction of the liquid crystal molecules and the dye molecules, as shown in FIG. 8 (*b*). Then, the photopolymerization or thermal polymerization is performed on the dye liquid crystal cell, such that the polymerizable monomers in the dye liquid crystal mixture react to form the polymer network, which is the vertical polymer network arranged parallel to the liquid crystal molecules due to the inducing action of the liquid crystal molecules, as shown in FIG. 8 (*c*). Finally, the voltage applied on the first substrate and the second substrate is removed, such that the liquid crystal molecules and the dye molecules are restored to the planar spiral arrangement, and the polymer network is still presented in a vertical structure, so as to manufacture the light-adjusting glass in the normally black mode with the vertical polymer network, as shown in FIG. 8 (*d*).

Figure 9:
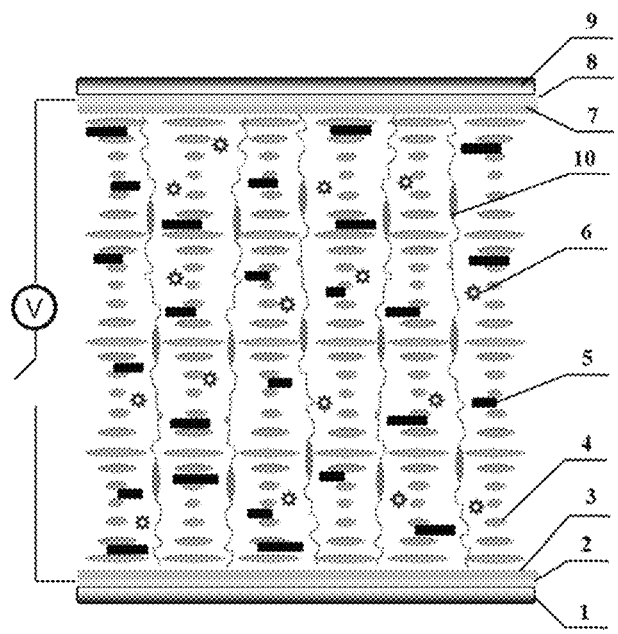
FIG. 9 is a schematic cross-sectional view of a structure of a light-adjusting glass in a normally black mode when being not energized according to an embodiment of the present disclosure.
Figure 10:
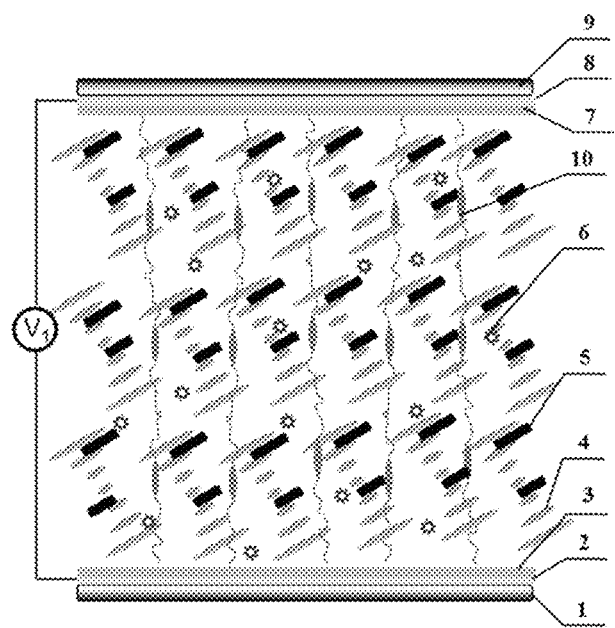
FIG. 10 is a cross-sectional view of the light-adjusting glass of FIG. 9 with a small first voltage V1 applied to first and second electrodes thereof.
Figure 11:
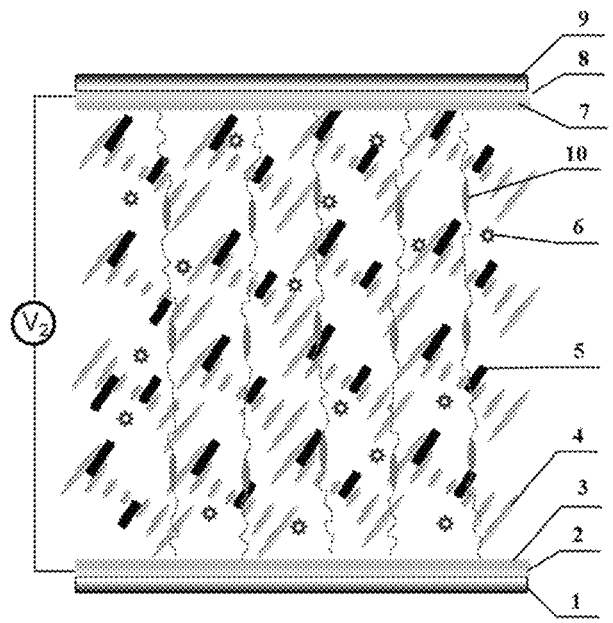
FIG. 11 is a cross-sectional view of the light-adjusting glass of FIG. 9 with a second voltage V2 applied to the first and second electrodes.
Figure 12:
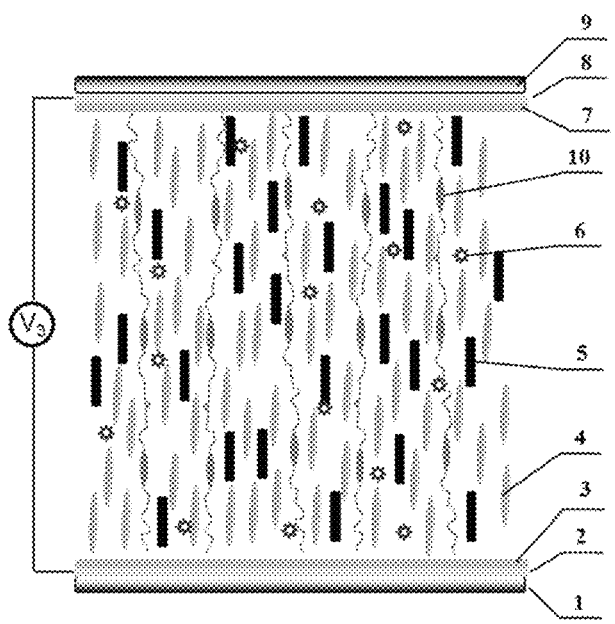
FIG. 12 is a cross-sectional view of the light-adjusting glass of FIG. 9 with a higher third voltage V3 applied to the first and second electrodes.

FIG. 9 is a schematic cross-sectional structural diagram of a light-adjusting glass in a normally black mode when being not energized according to the embodiment of the present disclosure. As shown in FIG. 9, the liquid crystal molecules 4 in the dye liquid crystal layer of the light-adjusting glass in this mode exhibit uniform planar spiral texture arrangement under the action of the chiral additives 6, the first alignment layer 3 and the second alignment layer 7, the spiral axis is perpendicular to the first substrate and the second substrate, the liquid crystal molecules 4 and the dye molecules 5 are spirally arranged in a plane parallel to the first substrate and the second substrate, and the dye molecules 7 may absorb polarized light incident in each direction, and the light absorbance of regions is the same, thereby exhibiting a uniform dark state. When a smaller first voltage V1 is applied to the first electrode 2 and the second electrode 8, although the spiral twisting force of the chiral additives 6 is larger and the electric field force between the first substrate and the second substrate is smaller, due to the presence of the vertical polymer network 10, the liquid crystal molecules 4 may be induced to be likely arranged parallel to the polymer network, i.e. parallel to the direction of the electric field, so as to amplify the effect of the electric field force on the liquid crystal molecules, so that the spiral twisting force of the chiral additives 6 and the electric field force are balanced with each other, and the whole dye liquid crystal layer forms a uniform inclined spiral texture arrangement, as shown in FIG. 10. The dye molecules in corresponding different regions are uniformly arranged and have a uniform light absorbance, and a uniform gray scale state is presented. The voltage applied to the first electrode and the second electrode is continuously increased, the spiral twisting force and the electric field force in the cell are kept balanced with each other due to the inducing effect of the vertical polymer network 10, the spiral texture is uniformly inclined under the effect of the electric field force, forming a uniform inclined spiral texture arrangement, and achieving a uniform transmittance, as shown in FIG. 11. When a higher third voltage V3 is applied to the first electrode 2 and the second electrode 8, the electric field force is significantly greater than the spiral twisting force of the chiral additives 6, the liquid crystal molecules 4 are uncoiled to form a homeotropic state, and all the liquid crystal molecules 4 are arranged parallel to the electric field direction, i.e., perpendicular to the first substrate and the second substrate, as shown in FIG. 12, and the corresponding induced dye molecules 5 are arranged perpendicular to the first substrate and the second substrate, so that the absorption of incident light is minimized, and a uniform bright state is achieved. When the voltage is rapidly removed from a high level, due to the anchoring effect of the vertical polymer network 10, the acting force which causes the liquid crystal molecules 4 to be arranged perpendicular to the first substrate does not disappear instantly, namely the acting force disappears gradually, so that the liquid crystal molecules 4 are gradually changed into the planar spiral texture under the action of the spiral twisting force of the chiral additives 6, avoiding a phenomenon of disordered arrangement (the focal conic texture) of the liquid crystal molecules 4 when the voltage is removed, and the dye molecules in corresponding regions are uniformly arranged, the light absorbance is the same, further preventing a phenomenon of non-uniform voltage reduction, and achieving the purpose of randomly switching gray scale light adjustment.

Figure 13:
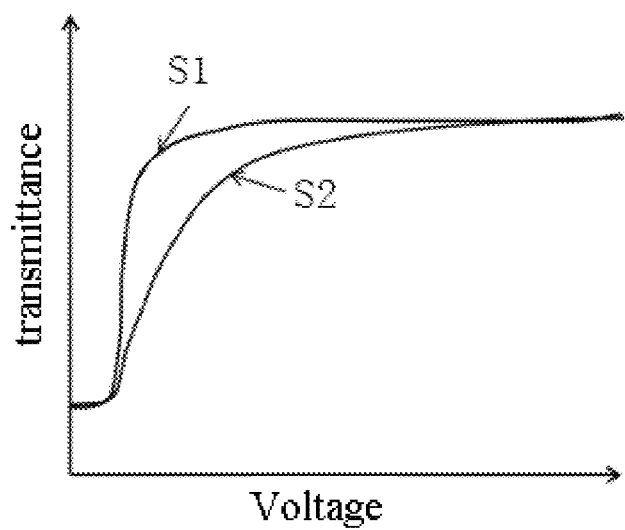
FIG. 13 is a graph of a transmittance versus a voltage (V-T) for a light-adjusting glass in a normally black mode without and with a polymer network.

FIG. 13 is a graph of a transmittance versus a voltage (V-T) for a light-adjusting glass in a normally black mode without and with a polymer network. As shown in FIG. 13, for the light-adjusting glass without the polymer network in the normally black mode, a curve of the transmittance versus the voltage (V-T) is steep. When the voltage is increased or decreased, the liquid crystal molecules, the dye molecules, the chiral additives, and the like are easily arranged in disorder, so Mura defects are generated, and the gray scale cannot be realized, as shown in a curve S1 in FIG. 13. In the light-adjusting glass with the polymer network in the normally black mode in the embodiment of the present disclosure, due to the action of the polymer network, the arrangement of the liquid crystal molecules, the dye molecules and the chiral additives may be continuously changed when the voltage is increased or decreased, the corresponding curve of the transmittance versus the voltage (V-T) is relatively slow, so Mura defects are not generated, and the gray scale may be realized. That is, in the case of no Mura defects, the transmittance may be adjusted by adjusting the voltage, thereby adjusting the gray scale, as shown by a curve S2 in FIG. 13.

Figure 14:
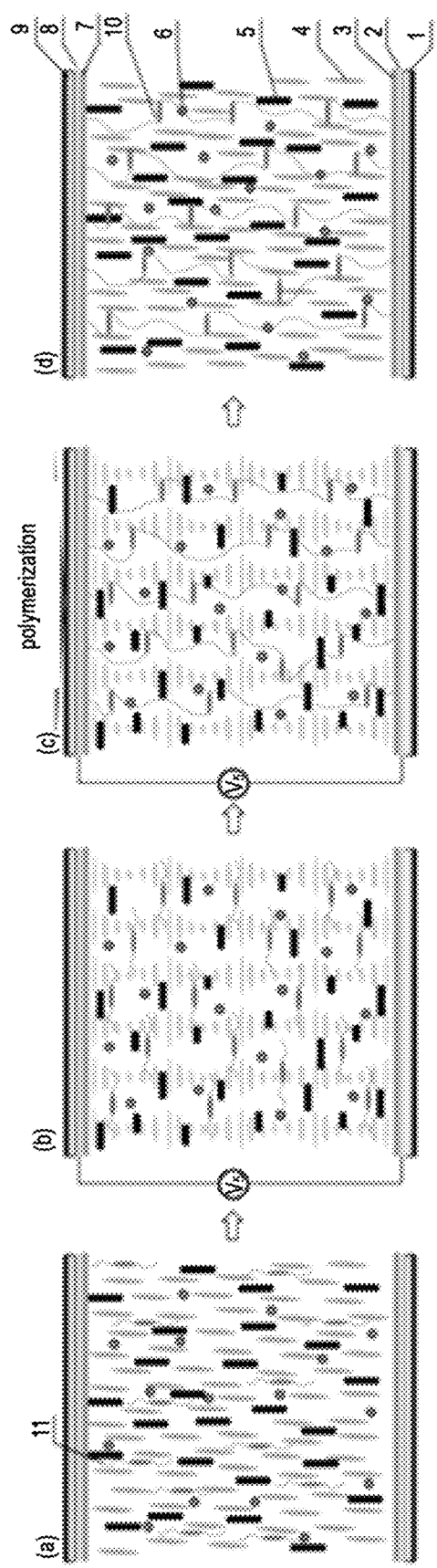
FIG. 14 is a schematic cross-sectional diagram illustrating structures of a procedure for manufacturing a light-adjusting glass in a normally white mode according to an embodiment of the present disclosure.

In one example, the light-adjusting glass is in a normally white mode. The polymerizable monomers of the polymer network in the dye liquid crystal layer are spirally arranged in a plane on which the first substrate (the second substrate) is positioned. That is, the polymer network is a planar spiral polymer network. The light-adjusting glass in the normally white mode capable of realizing the gray scale light adjustment and randomly switching among different gray scales is manufactured by means of the induced anchoring effect of the polymer network. FIG. 14 is a schematic cross-sectional structural diagram of a process for manufacturing a light-adjusting glass in a normally white mode according to the embodiment of the present disclosure. Firstly, the first substrate and the second substrate are formed, a dye liquid crystal mixture, which is uniformly mixed according to a certain proportion and contains negative liquid crystal molecules, dye molecules, chiral additives, polymerizable monomers and initiators, is dripped on one of the first substrate and the second substrate, and a sealant (seal glue) is coated on the other of the first substrate and the second substrate, and the first substrate and the second substrate are then aligned and assembled, forming a dye liquid crystal cell, wherein the dye liquid crystal mixture is arranged perpendicular to the first substrate and the second substrate in the dye liquid crystal cell, such that the incident light is not substantially absorbed, and a uniform bright state is presented, as shown in FIG. 14 (*a*). Then, photopolymerization or thermal polymerization is performed on the dye liquid crystal cell, so that the first substrate and the second substrate are adhered by means of curing of the seal glue, while the polymerizable monomers in the dye liquid crystal mixture are ensured not to react; a high fifth voltage V5 is applied to the first substrate and the second substrate to cause the liquid crystal molecules and the dye molecules to be arranged parallel to the surface of the first substrate, and be spirally aligned along the spiral axis perpendicular to the surface of the first substrate under the action of the chiral additives to form the uniform planar spiral texture, as shown in FIG. 14 (*b*). Then, the photopolymerization or thermal polymerization is performed on the dye liquid crystal cell, such that the polymerizable monomers in the dye liquid crystal mixture react to form the polymer network, for which the arrangement is similar to the planar spiral arrangement of the liquid crystal molecules due to the inducing action of the liquid crystal molecules. That is, the polymer network is the planar spiral polymer network, and the spiral degrees of all the polymers are the same, as shown in FIG. 14 (*c*). Finally, the voltage applied on the first substrate and the second substrate is removed, such that the liquid crystal molecules and the dye molecules are restored to be arranged perpendicular to the first substrate, and the polymer network is still presented in a planar spiral structure, so as to manufacture the light-adjusting glass in the normally white mode with the planar spiral polymer network, as shown in FIG. 14 (*d*).

Figure 15:
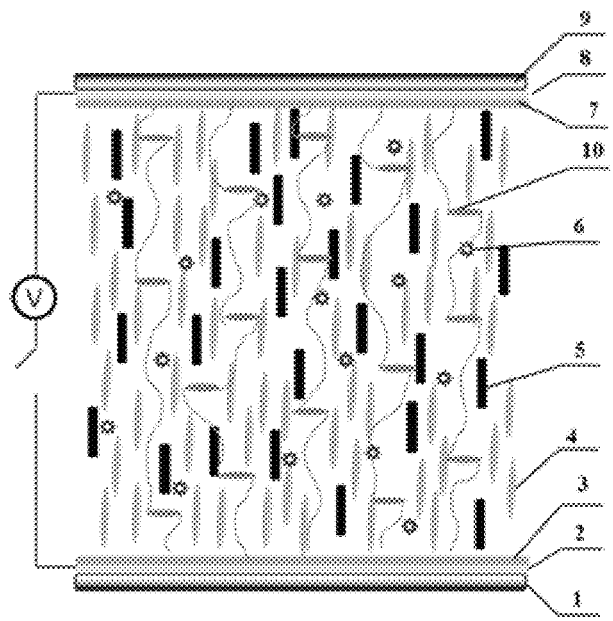
FIG. 15 is a schematic cross-sectional diagram of a structure of a light-adjusting glass in a normally white mode according to an embodiment of the present disclosure.
Figure 16:
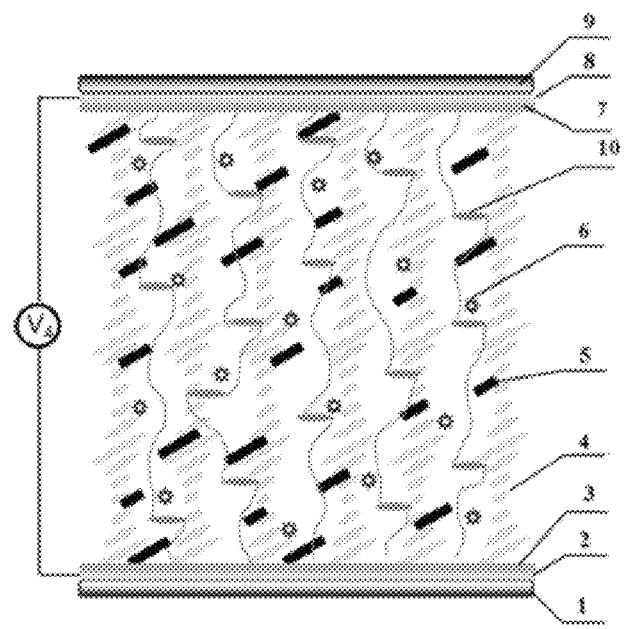
FIG. 16 is a cross-sectional view of the light-adjusting glass of FIG. 15 with a small fourth voltage V4 applied to first and second electrodes thereof.
Figure 17:
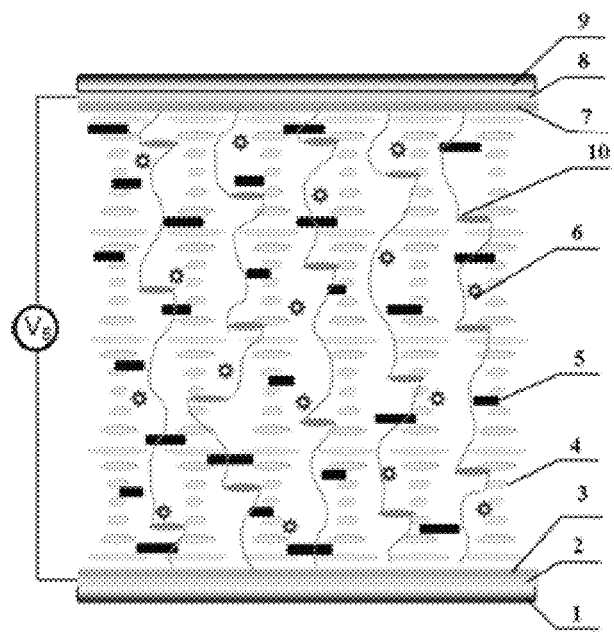
FIG. 17 is a cross-sectional view of the light-adjusting glass of FIG. 15 with a higher fifth voltage V5 applied to the first and second electrodes.

FIG. 15 is a schematic cross-sectional structural diagram of a light-adjusting glass in a normally white mode when being not energized. As shown in FIG. 15, the liquid crystal molecules 4 in the dye liquid crystal layer of the light-adjusting glass in this mode exhibit uniform arrangement perpendicular to the first substrate or the second substrate under the action of the chiral additives 6, the first alignment layer 3 and the second alignment layer 7, such that the incident light is not substantially absorbed, and the uniform bright state is presented. When the content of the chiral additives 6 in the dye liquid crystal layer is high, and when a small fourth voltage V4 is applied to the first electrode 2 and the second electrode 8, due to the inducing action of the planar spiral polymer network 10, the liquid crystal molecules 4 tip under the action of the electric field and form a uniform oblique spiral arrangement, as shown in FIG. 16, so that the twisting degrees of the liquid crystal molecules 4 in different regions are the same, the twisting degrees of the corresponding dye molecules 5 are the same, and the light absorbance is the same, that is, the transmittances in the regions are the same, and no defects such as sandy Mura occur, thereby realizing the gray scale light adjustment. When the content of the chiral additives 6 in the dye liquid crystal layer is low, a high fifth voltage V5 is applied to the first electrode 2 and the second electrode 8, the electric field force between the first substrate and the second substrate is greater than the spiral twisting force, but the planar spiral polymer network 10 may induce the liquid crystal molecules 4 to be spirally arranged, i.e., the spiral twisting force is enhanced, so that the electric field force and the spiral twisting force are balanced with each other, and a uniform oblique spiral arrangement is formed in different regions, thereby avoiding defects such as sandy Mura. The light-adjusting glass with the planar spiral polymer network in the normally white mode may realize the uniform spiral arrangement under different voltages, no matter the content of the chiral additives 6 in the dye liquid crystal layer is high or low. That is, the uniform transmittance of the whole dye liquid crystal layer is realized, and the gray scale light adjustment and the randomly switching function among different gray scales are realized. When a large voltage is applied to the first electrode 2 and the second electrode 8, the electric field force increases, the liquid crystal molecules 4 tend to be arranged parallel to the surface of the first substrate, and at the same time, under the action of the spiral twisting force of the chiral additives 6 and the inducing action of the spiral polymer network 10, the liquid crystals arranged parallel to the first substrate are arranged along the spiral axis perpendicular to the surface of the first substrate, and the electric field force and the spiral twisting force act simultaneously and are balanced with each other, such that the liquid crystal molecules 4 may rapidly form a uniform planar spiral texture arrangement, as shown in FIG. 17.

Figure 18:
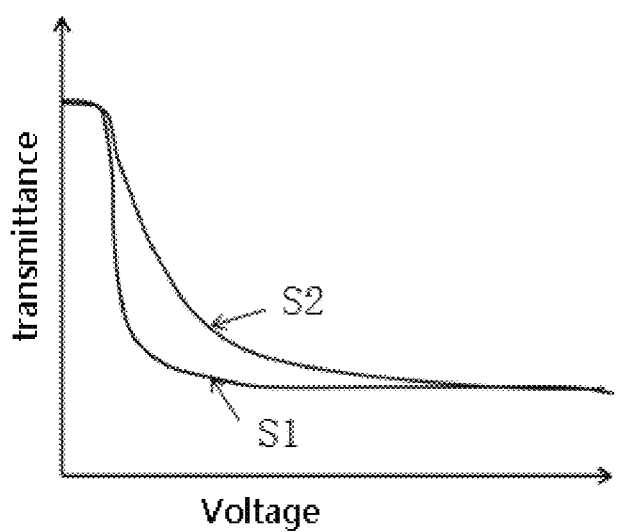
FIG. 18 is a graph of a transmittance versus a voltage (V-T) for a light-adjusting glass in a normally white mode without and with a polymer network.

FIG. 18 is a graph of a transmittance versus a voltage (V-T) for a light-adjusting glass in a normally white mode without and with a polymer network. As shown in FIG. 18, for the light-adjusting glass without the polymer network in the normally white mode, a curve of the transmittance versus the voltage (V-T) is steep. When the voltage is increased or decreased, the liquid crystal molecules, the dye molecules, the chiral additives, and the like are easily arranged in disorder, so Mura defects are generated, and the gray scale cannot be realized, as shown in a curve S1 in FIG. 18. In the light-adjusting glass with the polymer network in the normally white mode in the embodiment of the present disclosure, due to the action of the polymer network, the arrangement of the liquid crystal molecules, the dye molecules and the chiral additives may be continuously changed when the voltage is increased or decreased, the corresponding curve of the transmittance versus the voltage (V-T) is relatively slow, so Mura defects are not generated, and the gray scale may be realized. That is, in the case of no Mura defects, the transmittance may be adjusted by adjusting the voltage, thereby adjusting the gray scale, as shown by a curve S2 in FIG. 18.

In some embodiments, the polymerizable monomer forming the polymer network in the dye liquid crystal layer may be a photo-polymerizable monomer or a thermally polymerizable monomer. The polymerizable monomer may be the photo-polymerizable monomer because reaction conditions of the photo-polymerizable monomer are easy to control. The photo-polymerizable monomer includes, but is not limited to, an Ultraviolet (UV) photo-polymerizable monomer or a photo-polymerizable monomer of a specific wavelength. When the polymerizable monomer employs the photo-polymerizable monomer, the photo-polymerizable monomer includes, but is not limited to, an acrylic monomer; when the polymerizable monomer employs the thermally polymerizable monomer, the thermally polymerizable monomer includes, but is not limited to, an epoxy-based monomer.

In some embodiments, the dye liquid crystal layer is formed by the dye liquid crystal mixture consisting of liquid crystal molecules, dye molecules, chiral additives, polymerizable monomers, and initiators, wherein the type of the initiator depends on the selected type of the polymerizable monomers. The total content (mass ratio) of the polymerizable monomers in the dye liquid crystal mixture is 1% to 40%, for example 2% to 5%; the total content (mass ratio) of the chiral additives is 0.2 to 10%, for example 0.5 to 2%. Of course, the total content of the polymerizable monomers and the total content of the chiral additives in the dye liquid crystal mixture may also be specifically set according to the size of the light-adjusting glass.

Figure 19:
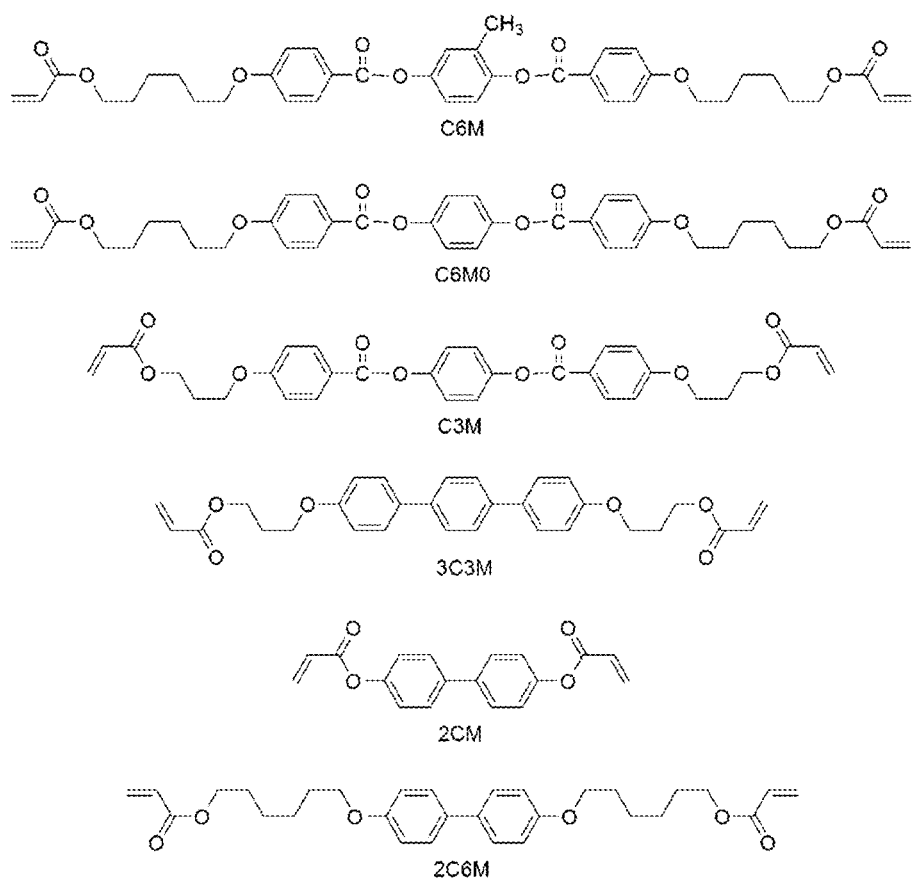
FIG. 19 is a schematic diagram of structures of liquid crystalline photo-polymerizable monomers used in a light-adjusting glass according to an embodiment of the present disclosure.
Figure 20:
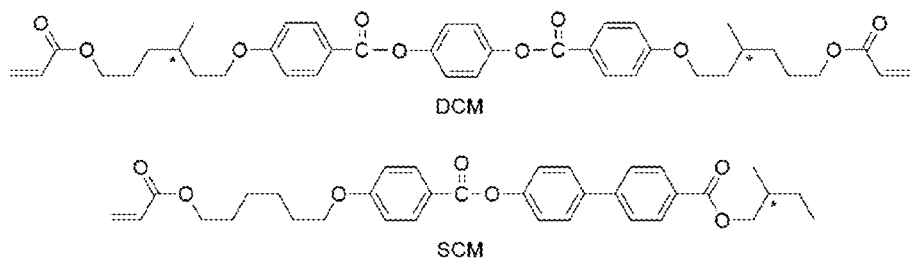
FIG. 20 is a schematic diagram of structures of chiral liquid crystalline photo-polymerizable monomers used in a light-adjusting glass according to an embodiment of the present disclosure.
Figure 21:
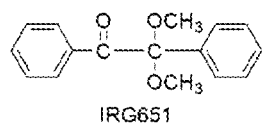
FIG. 21 is a schematic diagram of structures of liquid crystalline photoinitiators used in a light-adjusting glass according to an embodiment of the present disclosure.
Figure 21:
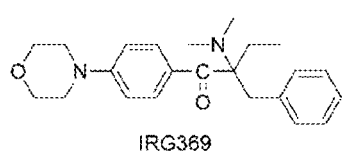
Figure 21:
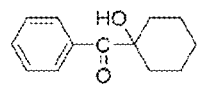
Figure 21:
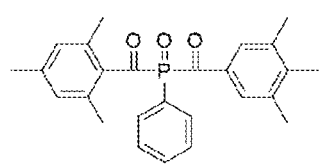
Figure 22:
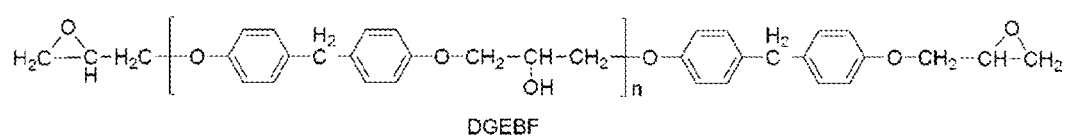
FIG. 22 is a schematic diagram of structures of thermally polymerizable monomers used in a light-adjusting glass according to an embodiment of the present disclosure.
Figure 22:
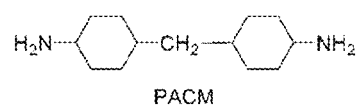
Figure 22:
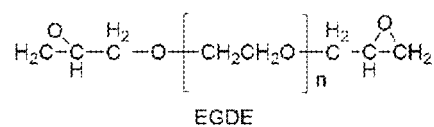
Figure 22:
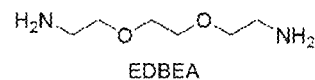
Figure 23:
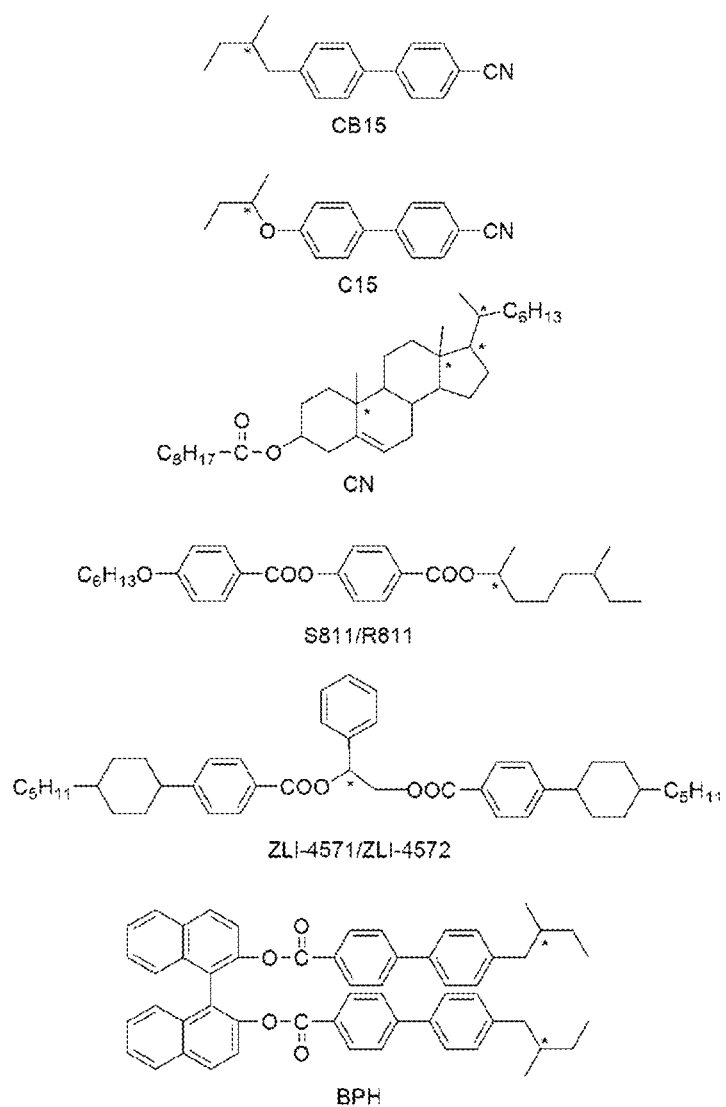
FIG. 23 is a schematic diagram of structures of chiral additives used in a light-adjusting glass according to an embodiment of the present disclosure.

In the embodiment of the present disclosure, FIG. 19 is a schematic structural diagram of a liquid crystalline photo-polymerizable monomer used in a light-adjusting glass according to the embodiment of the present disclosure. As shown in FIG. 19, the polymer monomer in the embodiment of the present disclosure may be the liquid crystalline photo-polymerizable monomer including, but not limited to, C6M [2-methyl-1, 4-phenylbis (4-(6-(acryloyloxy) hexyloxy) benzoate)], C6M0[1, 4-phenylbis (4-(6-(acryloyloxy) hexyloxy) benzoate)], C3M [1, 4-phenylbis (4-(3-(acryloyloxy) propoxy) benzoate)], 2CM [biphenyl-4, 4'-diacyl diacrylate] and the like. FIG. 20 is a schematic structural diagram of a chiral liquid crystalline photo-polymerizable monomer used in a light-adjusting glass according to the embodiment of the present disclosure. As shown in FIG. 20, the polymerizable monomer in the embodiments of the present disclosure may be the chiral liquid crystalline photo-polymerizable monomer including, but not limited to, DCM [1, 4-phenylbis (4-(6-(acryloyloxy)-3-methylhexyloxy) benzoate)], SCM [2-methylbutyl 4'-(4-(6-(acryloyloxy) hexyloxy) phenoxy) biphenyl-4-carboxylate], and the like. FIG. 21 is a schematic structural diagram of a liquid crystalline photoinitiator used in a light-adjusting glass according to the embodiment of the present disclosure. As shown in FIG. 21, the initiator in the embodiment of the present disclosure may be a photoinitiator including, but not limited to, IRG651[2, 2-dimethoxy-1, 2-DL-Benzoin], IRG369[2-benzyl-2-(dimethylamino)-1-(4-morpholinophenyl) butane], IRG184[(1-hydroxy cyclohexyl) (phenyl) methanol], IRG819[methylene (phenyl (3, 4, 5-trimethylbenzoyl) phosphate) methanol], and the like. FIG. 22 is a schematic structural diagram of a thermally polymerizable monomer used in a light-adjusting glass according to the embodiment of the present disclosure. As shown in FIG. 22, the polymer monomer in embodiments of the present disclosure may be the thermally polymerizable monomer including, but not limited to, DGEBF [1, 3-bis (4-(4-(oxidane-2-ylmethoxy) benzyl) phenoxy) propan-2-alcohol], PACM[4, 4'-methylene dicyclohexylamine], EGDE [1, 2-bis (oxidane-2-ylmethoxy) ethane], EDBEA [2, 2'-(ethane-1, 2-diylbis (oxy)) diethanamine], and the like. FIG. 23 is a schematic structural view of a chiral additive used in the light-adjusting glass of an embodiment of the present disclosure. As shown in FIG. 23, chiral additives of embodiments of the present disclosure include, but are not limited to, CB15[4'-(2-methyl butyl) biphenyl-4-carbonitrile], C15[4'-sec-butoxybiphenyl-4-carbonitrile], CN [10, 13-dimethyl-17-(octane-2-yl)-2, 3, 4, 7, 8, 9, 10, 11, 12, 13, 14, 15, 16, 17-tetradecahydro-1H-cyclopenta[a]phenanthren-3-yl nonanoate], S811/R811 [6-methyl octan-2-yl 4-(4-(hexyloxy) benzoyloxy) benzoate], ZLI-4571/ZLI-4572 [1-phenylethane-1, 2-diacyl bis (4-(4-pentyl cyclohexyl) benzoate)], BPH [1, 1'-binaphthyl-2, 2'-diacyl bis (4'42-methyl butyl) biphenyl-4-carboxylate)], and the like.

In some embodiments, the first substrate includes: the first base, a first electrode and a first alignment layer which are sequentially arranged on a side of the first base proximal to the dye liquid crystal layer; the second substrate includes: the second base, a second electrode and a second alignment layer which are sequentially arranged on a side of the second base proximal to the dye liquid crystal layer; wherein the first electrode and the second electrode may be both plate-shaped electrodes, and the formed dye liquid crystal cell is a VA mode liquid crystal cell. Of course, one of the first electrode and the second electrode may be a strip-shaped electrode, and the other may be a plate-shaped electrode. In the embodiments of the present disclosure, the positions and structures of the first electrode and the second electrode are not limited, as long as the first electrode and the second electrode are included, such that liquid crystal molecules of the dye liquid crystal layer are rotated after a voltage is applied to the first electrode and the second electrode.

In some embodiments, the light-adjusting glass may include a plurality of the light-adjusting modules which are provided in a stack, and each light-adjusting module may adopt any one of the above structures. The light-adjusting glass having the plurality of light-adjusting modules may realize an adjustment of more gray scale brightness.

The embodiment of the present disclosure provides a method for manufacturing a light-adjusting glass, and the method may be used for manufacturing the above light-adjusting glass. The method for manufacturing a light-adjusting glass in the embodiment of the present disclosure includes the steps of forming a light-adjusting module; the step of forming the light-adjusting module includes: forming a first substrate, a second substrate and forming a dye liquid crystal layer between the first substrate and the second substrate; the dye liquid crystal layer is provided with a polymer network, which is used for enabling the twisting degrees of liquid crystal molecules in the dye liquid crystal layer to be substantially the same, and enabling the twisting degrees of dye molecules in the dye liquid crystal layer to be substantially the same, when an electric field generated between the first substrate and the second substrate changes.

Because the dye liquid crystal layer in the embodiment of the present disclosure includes the polymer network, the polymer network may, by means of anchoring effect thereof, enable the twisting degrees of liquid crystal molecules in the dye liquid crystal layer to be substantially the same, and enabling the twisting degrees of dye molecules in the dye liquid crystal layer to be substantially the same, when an electric field generated between the first substrate and the second substrate changes, that is, when the voltage applied on the first electrode and the second electrode changes, so as to avoid a disorder of an arrangement of a dye molecules due to a disorder of an arrangement of the liquid crystal molecules at different positions. Therefore, the transmittance of the light-adjusting glass in the embodiment of the present disclosure is uniform, avoiding the non-uniformity such as sandy Mura.

In order to make the light-adjusting glass in the embodiments of the present disclosure more clearly, a case will be described as an example where the light-adjusting glass only includes one glass module, and the light-adjusting glass is in a normally black mode and a normally white mode, respectively.

Figure 24:
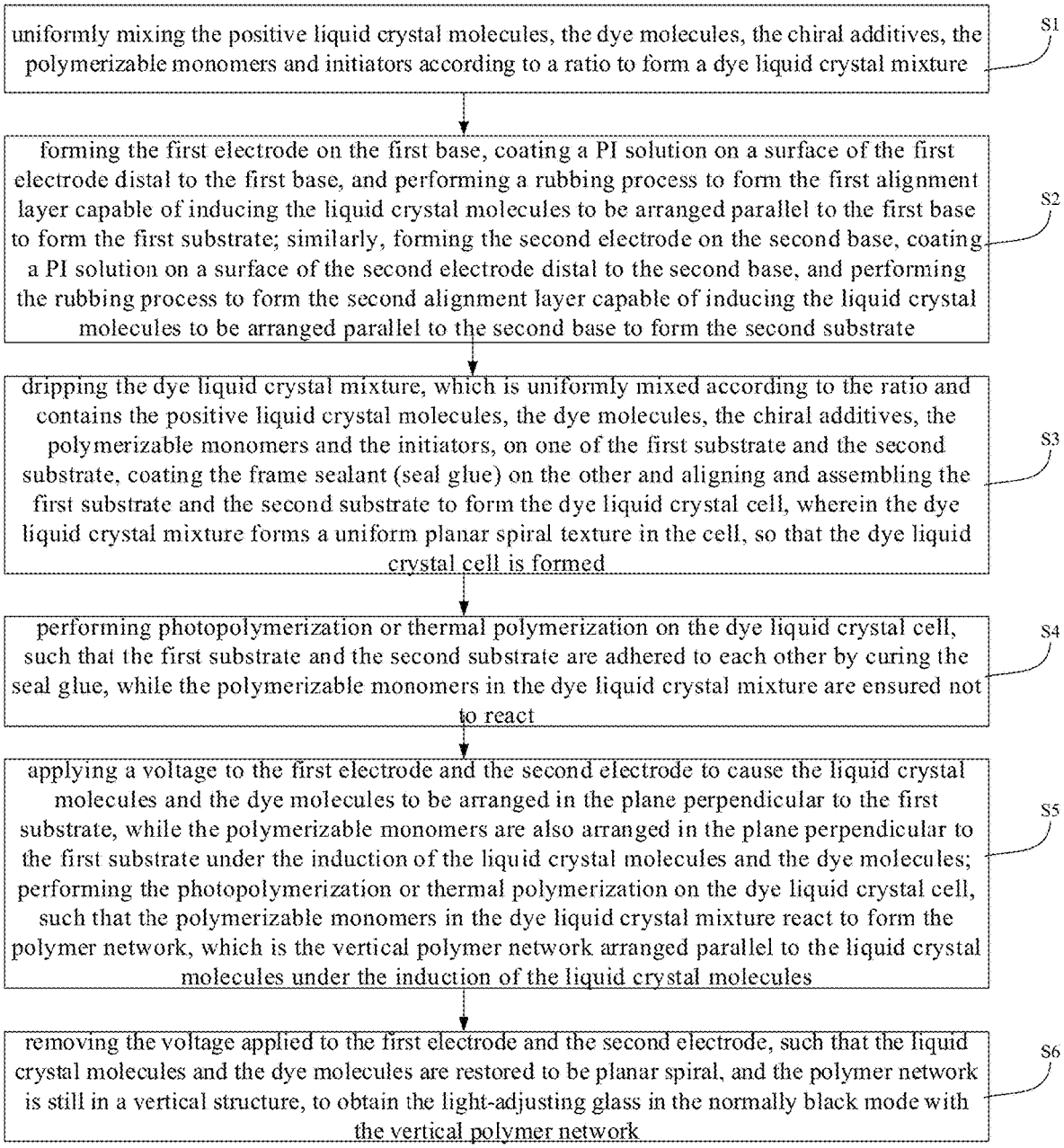
FIG. 24 is a schematic flow chart illustrating a method for manufacturing a light-adjusting glass in a normally black mode according to an embodiment of the present disclosure.

In one example, the light-adjusting glass is in a normally black mode. FIG. 24 is a schematic flow chart illustrating a manufacturing process of a light-adjusting glass in a normally black mode according to the embodiment of the present disclosure. As shown in FIG. 24, the manufacturing method includes the following steps:

S1, uniformly mixing the positive liquid crystal molecules, the dye molecules, the chiral additives, the polymerizable monomers and the initiators according to a certain proportion to form the dye liquid crystal mixture.

S2, forming the first electrode on the first base, coating PI solution on a surface of the first electrode distal to the first base, and performing a Rubbing process to form the first alignment layer capable of inducing the liquid crystal molecules to be arranged parallel to the first base, so as to form the first substrate; similarly, forming the second electrode on the second base, coating the PI solution on a surface of the second electrode distal to the second base, and performing the Rubbing process to form the second alignment layer capable of inducing the liquid crystal molecules to be arranged parallel to the second base, so as to form the second substrate.

S3, dripping the dye liquid crystal mixture, which is uniformly mixed according to the certain proportion and contains the positive liquid crystal molecules, the dye molecules, the chiral additives, the polymerizable monomers and the initiators, on one of the first substrate and the second substrate, coating the sealant (seal glue) on the other one, and aligning and assembling the first substrate and the second substrate to form the dye liquid crystal cell, wherein the dye liquid crystal mixture forms a uniform planar spiral texture in the cell, so that the dye liquid crystal cell is formed.

S4, performing the photopolymerization or thermal polymerization on the dye liquid crystal cell, so that the first substrate and the second substrate are adhered by means of curing of the seal glue, while the polymerizable monomers in the dye liquid crystal mixture are ensured not to react. In this step, if the photo-polymerizable monomer is selected to form the polymer network, the thermal polymerization process may be selected to adhere the first and second substrates; if the first substrate and the second substrate are adhered by adopting the photopolymerization process, the photo-polymerizable monomers need to be shielded by a light shielding part so as to avoid the reaction of the photo-polymerizable monomers; if a thermally polymerizable monomer is used, the thermal polymerization process is avoided as much as possible in this step to ensure that the polymerizable monomers in the dye liquid crystal mixture does not react but only adheres the first substrate and the second substrate.

S5, applying a voltage to the first electrode and the second electrode to cause the liquid crystal molecules and the dye molecules to be arranged in the plane perpendicular to the first substrate, while the polymerizable monomers are also arranged in the plane perpendicular to the first substrate under the induction of the liquid crystal molecules and the dye molecules; performing the photopolymerization or thermal polymerization on the dye liquid crystal cell, such that the polymerizable monomers in the dye liquid crystal mixture react to form the polymer network, which is the vertical polymer network arranged parallel to the liquid crystal molecules due to the inducing action of the liquid crystal molecules.

S6, removing the voltage applied on the first electrode and the second electrode, such that the liquid crystal molecules and the dye molecules are restored to be planar spiral, and the polymer network is still presented in a vertical structure, so as to manufacture the light-adjusting glass in the normally black mode with the vertical polymer network.

It should be noted that the order of the above steps S1 and S2 may be exchanged.

Two specific examples for manufacturing the light-adjusting glass in the normally black mode are given below.

In one example, the method for manufacturing the light-adjusting glass in the normally black mode specifically includes the following steps:

S1, uniformly mixing dye liquid crystal molecules (dye molecules+liquid crystal molecules) MDA-18-1670 (for a specific type of dye liquid crystal molecules, a mass ratio of the dye molecules to the liquid crystal molecules therein is fixed), the chiral additives ZLI-4571, the polymerizable monomers C3M (which are liquid crystalline photo-polymerizable monomers) and photoinitiators IRG184 according to a mass ratio of 91.9%/1.5%/6%/0.6%, to form the dye liquid crystal mixture.

S2, forming the first electrode on the first base, coating SE-7953 PI solution on a surface of the first electrode distal to the first base, and performing a Rubbing process to form the first alignment layer capable of inducing the liquid crystal molecules to be arranged parallel to the first base, so as to form the first substrate; similarly, forming the second electrode on the second base, coating the SE-7953 PI solution on a surface of the second electrode distal to the second base, and performing the Rubbing process to form the second alignment layer capable of inducing the liquid crystal molecules to be arranged parallel to the second base, so as to form the second substrate.

S3, dropping the dye liquid crystal mixture formed in step S1 on one of the first substrate and the second substrate, coating the SWB-101R Seal glue on the other one, and aligning and assembling the first substrate and the second substrate to form the dye liquid crystal cell.

S4, performing the photopolymerization or thermal polymerization on the dye liquid crystal cell, so that the first substrate and the second substrate are adhered by means of curing of the seal glue, while the polymerizable monomers in the dye liquid crystal mixture are ensured not to react. In this embodiment, if the photo-polymerizable monomer is selected to form the polymer network, the thermal polymerization process may be selected to adhere the first and second substrates in this step; if the first substrate and the second substrate are adhered by adopting the photopolymerization process, the photo-polymerizable monomers need to be shielded by a light shielding part so as to avoid the reaction of the photo-polymerizable monomers.

S5, applying a voltage to the first electrode and the second electrode of the dye liquid crystal cell after the step S4 to cause the liquid crystal molecules and the dye molecules to be arranged perpendicular to the first substrate and the second substrate; at this time, performing the photopolymerization, wherein a wavelength of ultraviolet light is 365 nm, a polymerization intensity is 10 mW/cm$^2$, and the time is 20 min, so that the polymerizable monomers in the dye liquid crystal mixture react to form the vertical polymer network.

S6, removing the voltage applied on the first electrode and the second electrode, such that the liquid crystal molecules and the dye molecules are restored to be planar spiral, and the polymer network is still presented in a vertical structure, so as to manufacture the light-adjusting glass in the normally black mode with the vertical polymer network.

In another example, the method for manufacturing the light-adjusting glass in the normally black mode specifically includes the following steps:

S1, uniformly mixing dye liquid crystal molecules (dye molecules+liquid crystal molecules) MDA-18-1670 (for a specific type of dye liquid crystal molecules, a mass ratio of the dye molecules to the liquid crystal molecules therein is fixed), the chiral additives BPH, the polymerizable monomers DGEBF (a type of the thermally polymerizable monomer) and the polymerizable monomers PACM (a type of the thermally polymerizable monomer) according to a mass ratio of 89.5%/0.5%/5%/5%, to form the dye liquid crystal mixture.

S2, forming the first electrode on the first base, coating SE-7451 PI solution on a surface of the first electrode distal to the first base, and performing a Rubbing process to form the first alignment layer capable of inducing the liquid crystal molecules to be arranged parallel to the first base, so as to form the first substrate; similarly, forming the second electrode on the second base, coating the SE-7451 PI solution on a surface of the second electrode distal to the second base, and performing the Rubbing process to form the second alignment layer capable of inducing the liquid crystal molecules to be arranged parallel to the second base, so as to form the second substrate.

S3, dropping the dye liquid crystal mixture formed in step S1 on one of the first substrate and the second substrate, coating the SWB-73R Seal glue on the other one, and aligning and assembling the first substrate and the second substrate to form the dye liquid crystal cell.

S4, performing the photopolymerization or thermal polymerization on the dye liquid crystal cell, so that the first substrate and the second substrate are adhered by means of curing of the seal glue, while the polymerizable monomers in the dye liquid crystal mixture are ensured not to react. In this embodiment, if the thermally polymerizable monomer is used, in this step, the thermal polymerization process is avoided as much as possible, or the used thermal polymerization process does not cause the thermally polymerizable monomers not to react, to ensure that the polymerizable monomers in the dye liquid crystal mixture does not react but only adheres the first substrate and the second substrate.

S5, applying a voltage to the first electrode and the second electrode of the dye liquid crystal cell after the step S4 to cause the liquid crystal molecules and the dye molecules to be arranged perpendicular to the first substrate and the second substrate; at this time, performing the thermal polymerization, wherein a condition is 40° C./40 min, so that the polymerizable monomers in the dye liquid crystal mixture react to form the vertical polymer network.

S6, removing the voltage applied on the first electrode and the second electrode, such that the liquid crystal molecules and the dye molecules are restored to be planar spiral, and the polymer network is still presented in a vertical structure, so as to manufacture the light-adjusting glass in the normally black mode with the vertical polymer network.

Figure 25:
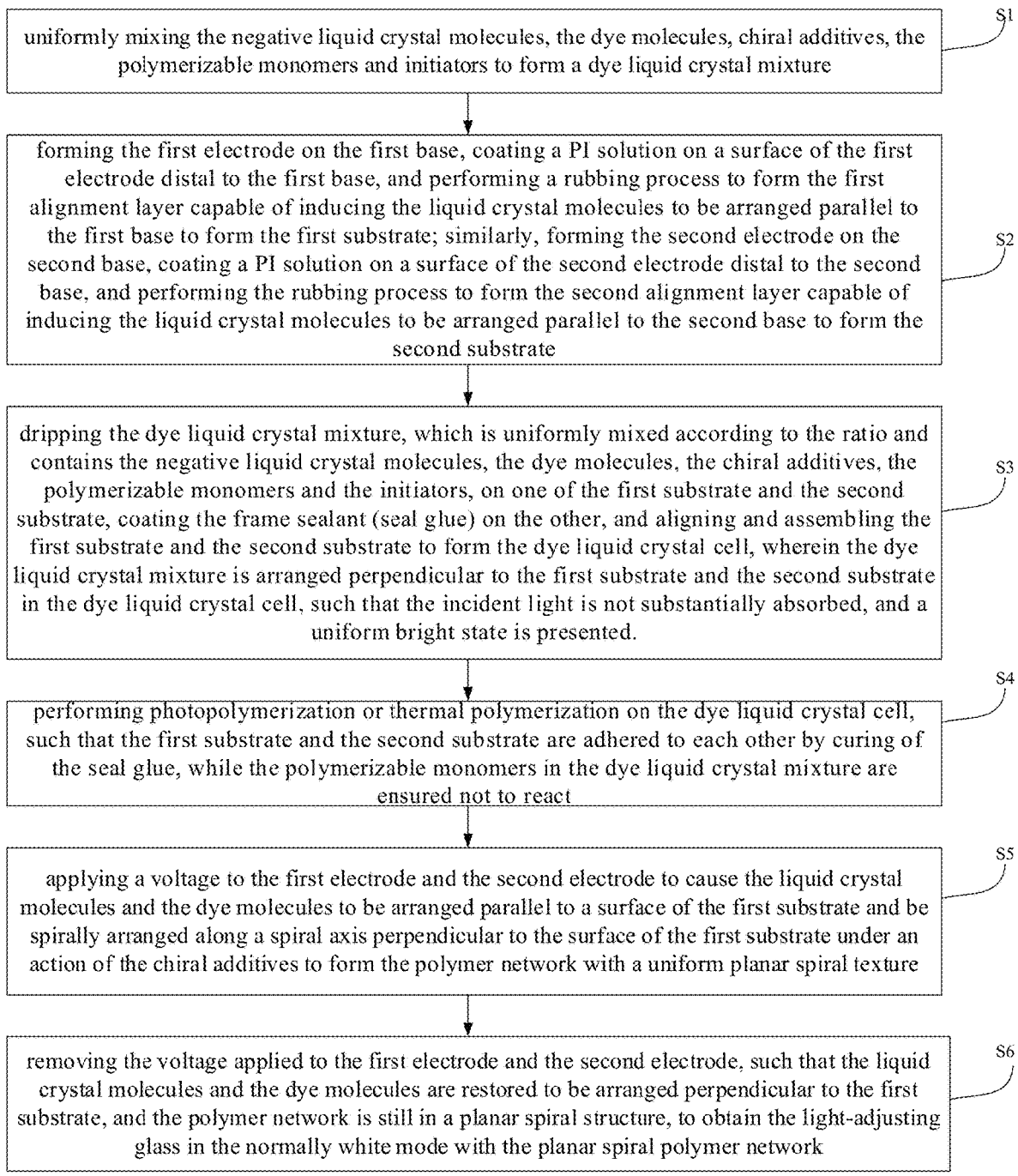
FIG. 25 is a schematic flow chart illustrating a method for manufacturing a light-adjusting glass in a normally white mode according to an embodiment of the present disclosure.

In one example, the light-adjusting glass is in a normally white mode. FIG. 25 is a schematic flow chart illustrating a manufacturing process of a light-adjusting glass in a normally white mode according to the embodiment of the present disclosure. As shown in FIG. 25, the manufacturing method includes the following steps:

S1, uniformly mixing the negative liquid crystal molecules, the dye molecules, the chiral additives, the polymerizable monomers and the initiators according to a certain proportion to form the dye liquid crystal mixture.

S2, forming the first electrode on the first base, coating PI solution on a surface of the first electrode distal to the first base, and performing a Rubbing process to form the first alignment layer capable of inducing the liquid crystal molecules to be arranged perpendicular to the first base, so as to form the first substrate; similarly, forming the second electrode on the second base, coating the PI solution on a surface of the second electrode distal to the second base, and performing the Rubbing process to form the second alignment layer capable of inducing the liquid crystal molecules to be arranged perpendicular to the second base, so as to form the second substrate.

S3, dripping the dye liquid crystal mixture, which is uniformly mixed according to the certain proportion and contains the negative liquid crystal molecules, the dye molecules, the chiral additives, the polymerizable monomers and the initiators, on one of the first substrate and the second substrate, coating the sealant (seal glue) on the other one, and aligning and assembling the first substrate and the second substrate to form the dye liquid crystal cell, wherein the dye liquid crystal mixture is arranged perpendicular to the first substrate and the second substrate in the dye liquid crystal cell, such that the incident light is not substantially absorbed, and a uniform bright state is presented.

S4, performing the photopolymerization or thermal polymerization on the dye liquid crystal cell, so that the first substrate and the second substrate are adhered by means of curing of the seal glue, while the polymerizable monomers in the dye liquid crystal mixture are ensured not to react. In this step, for example, if the photo-polymerizable monomer is used, the thermal polymerization process may be selected to adhere the first and second substrates; if the first substrate and the second substrate are adhered by adopting the photopolymerization process, the photo-polymerizable monomers need to be shielded by a light shielding part so as to avoid the reaction of the photo-polymerizable monomers; if a thermally polymerizable monomer is used, the thermal polymerization process is avoided as much as possible in this step to ensure that the polymerizable monomers in the dye liquid crystal mixture does not react but only adheres the first substrate and the second substrate.

S5, applying a voltage to the first electrode and the second electrode to cause the liquid crystal molecules and the dye molecules to be arranged parallel to the surface of the first substrate and be spirally aligned along the spiral axis perpendicular to the surface of the first substrate under the action of the chiral additives to form the polymer network with the uniform planar spiral texture.

S6, removing the voltage applied on the first electrode and the second electrode, such that the liquid crystal molecules and the dye molecules are restored to be arranged perpendicular to the first substrate, and the polymer network is still presented in a planar spiral structure, so as to manufacture the light-adjusting glass in the normally white mode with the planar spiral polymer network.

It should be noted that the order of the above steps S1 and S2 may be exchanged.

Two specific examples for manufacturing the light-adjusting glass in the normally white mode are given below.

In one example, a method for manufacturing the light-adjusting glass in the normally white mode specifically includes the following steps:

S1, uniformly mixing dye liquid crystal molecules MDA-18-2219 (for a specific type of dye liquid crystal molecules, a mass ratio of the dye molecules to the liquid crystal molecules therein is fixed), the chiral additives R811, the polymerizable monomers C6M (which are liquid crystalline photo-polymerizable monomers) and photoinitiators IRG651 according to a mass ratio of 92.5/2%/5%/0.5%, to form the dye liquid crystal mixture.

S2, forming the first electrode on the first base, coating DL-4018 PI solution on a surface of the first electrode distal to the first base, and performing a Rubbing process to form the first alignment layer capable of inducing the liquid crystal molecules to be arranged perpendicular to the first base, so as to form the first substrate; similarly, forming the second electrode on the second base, coating the DL-4018 PI solution on a surface of the second electrode distal to the second base, and performing the Rubbing process to form the second alignment layer capable of inducing the liquid crystal molecules to be arranged perpendicular to the second base, so as to form the second substrate.

S3, dropping the dye liquid crystal mixture formed in step S1 on one of the first substrate and the second substrate, coating the SWB-73 Seal glue on the other one, and aligning and assembling the first substrate and the second substrate to form the dye liquid crystal cell.

S4, performing the photopolymerization or thermal polymerization on the dye liquid crystal cell, so that the first substrate and the second substrate are adhered by means of curing of the seal glue, while the polymerizable monomers in the dye liquid crystal mixture are ensured not to react. For example, if the photo-polymerizable monomer is used, the thermal polymerization process may be selected to adhere the first and second substrates in this step; if the first substrate and the second substrate are adhered by adopting the photopolymerization process, the photo-polymerizable monomers need to be shielded by a light shielding part so as to avoid the reaction of the photo-polymerizable monomers; if a thermally polymerizable monomer is used, the thermal polymerization process is avoided as much as possible in this step to ensure that the polymerizable monomers in the dye liquid crystal mixture does not react but only adheres the first substrate and the second substrate.

S5, applying a voltage to the first electrode and the second electrode to cause the liquid crystal molecules and the dye molecules to be arranged parallel to the first substrate, and forming a spiral, i.e., the planar spiral arrangement, under the action of the chiral additives; at this time, performing an ultraviolet polymerization, wherein a wavelength of ultraviolet light is 365 nm, a polymerization intensity is 8 mW/cm$^2$, and the time is 30 min, so that the polymerizable monomers in the dye liquid crystal mixture react to form the planar spiral polymer network.

S6, removing the voltage applied on the first electrode and the second electrode, such that the liquid crystal molecules and the dye molecules are restored to be arranged perpendicular to the substrates, so as to manufacture the light-adjusting glass in the normally white mode with the planar spiral polymer network and capable of realizing the gray scale.

In another embodiment, a method for manufacturing the light-adjusting glass in normally white mode includes the following steps:

S1, uniformly mixing dye liquid crystal molecules MDA-18-2219, the chiral additives CB15, the polymerizable monomers C6M (a type of liquid crystalline photo-polymerizable monomers), the polymerizable monomers DCM (a type of chiral liquid crystalline photo-polymerizable monomers) and the initiators IRG651 according to a mass ratio of 87.5/1.5%/3%/7%/1.0%, to form the dye liquid crystal mixture.

S2, forming the first electrode on the first base, coating SE-4811 PI solution on a surface of the first electrode distal to the first base, and performing a Rubbing process to form the first alignment layer capable of inducing the liquid crystal molecules to be arranged perpendicular to the first base, so as to form the first substrate; similarly, forming the second electrode on the second base, coating the SE-4811 PI solution on a surface of the second electrode distal to the second base, and performing the Rubbing process to form the second alignment layer capable of inducing the liquid crystal molecules to be arranged perpendicular to the second base, so as to form the second substrate.

S3, dropping the dye liquid crystal mixture formed in step S1 on one of the first substrate and the second substrate, coating SWB-101 Seal glue on the other one, and aligning and assembling the first substrate and the second substrate to form the dye liquid crystal cell.

S4, performing the photopolymerization or thermal polymerization on the dye liquid crystal cell, so that the first substrate and the second substrate are adhered by means of curing of the seal glue, while the polymerizable monomers in the dye liquid crystal mixture are ensured not to react. In this embodiment, if the photo-polymerizable monomer is selected to form the polymer network, the thermal polymerization process may be selected to adhere the first and second substrates in this step; if the first substrate and the second substrate are adhered by adopting the photopolymerization process, the photo-polymerizable monomers need to be shielded by a light shielding part so as to avoid the reaction of the photo-polymerizable monomers.

S5, applying a voltage to the first electrode and the second electrode to cause the liquid crystal molecules and the dye molecules to be arranged parallel to the first substrate, and forming a spiral, i.e., the planar spiral arrangement, under the action of the chiral additives; at this time, performing an ultraviolet polymerization, wherein a wavelength of ultraviolet light is 365 nm, a polymerization intensity is 15 mW/cm², and the time is 10 min, so that the polymerizable monomers in the dye liquid crystal mixture react to form the planar spiral polymer network.

S6, removing the voltage applied on the first electrode and the second electrode, such that the liquid crystal molecules and the dye molecules are restored to be arranged perpendicular to the substrates, so as to manufacture the light-adjusting glass in the normally white mode with the planar spiral polymer network and capable of realizing the gray scale.

In a second aspect, an embodiment of the present disclosure further provides a glass assembly, which includes the above light-adjusting glass.

The glass module may be applied to traffic facilities such as automobiles, trains, airplanes and the like, and may also be applied to intelligent windows in buildings. Because the smart vehicle window in the embodiment of the present disclosure includes the above light-adjusting glass, the transmittance in the dark state is low, the CR is high, and the smart vehicle window is light and thin.

It should be understood that the above embodiments are merely exemplary embodiments employed to illustrate the principles of the present disclosure, but the present disclosure is not limited thereto. It will be apparent to one of ordinary skill in the art that various changes and modifications may be made therein without departing from the spirit and scope of the present disclosure, and these changes and modifications are to be considered within the scope of the present disclosure.

What is claimed is:

1. A light-adjusting glass, comprising at least one light-adjusting module; wherein the light-adjusting module comprises a first substrate and a second substrate opposite to each other, and a dye liquid crystal layer, having liquid crystal molecules and dye molecules, between the first substrate and the second substrate;
   wherein the liquid crystal molecules in the dye liquid crystal layer deflect under a control of an electric field between the first substrate and the second substrate, to control a transmittance of light; and
   the dye liquid crystal layer comprises a polymer network, which is configured such that when the electric field between the first substrate and the second substrate changes, twisting degrees of the liquid crystal molecules are identical, and twisting degrees of dye molecules are identical.

2. The light-adjusting glass of claim 1, wherein the light-adjusting glass is in a normally black mode, and the liquid crystal molecules comprise positive liquid crystal molecules; and polymerizable monomers of the polymer network are arranged along a plane perpendicular to the first substrate.

3. The light-adjusting glass of claim 1, wherein the light-adjusting glass is in a normally white mode; the liquid crystal molecules comprise negative liquid crystal molecules; and polymerizable monomers of the polymer network are planar spiral.

4. The light-adjusting glass of claim 1, wherein the at least one light-adjusting module comprises one light-adjusting module, and the dye liquid crystal layer further comprises chiral additives.

5. The light-adjusting glass of claim 4, wherein a mass ratio of the chiral additives in the dye liquid crystal layer is 0.2% to 10%.

6. The light-adjusting glass of claim 1, wherein the polymer network comprises photo-polymerizable monomers or thermally polymerizable monomers.

7. The light-adjusting glass of claim 6, wherein the photo-polymerizable monomer comprises an acrylic monomer; and the thermally polymerizable monomer comprises an epoxy-based monomer.

8. The light-adjusting glass of claim 1, wherein a mass ratio of polymerizable monomers of the polymer network in the dye liquid crystal layer is 1% to 40%.

9. The light-adjusting glass of claim 1, wherein the at least one light-adjusting module comprises a plurality of light-adjusting modules, and
   the plurality of light-adjusting modules are stacked together.

10. The light-adjusting glass of claim 2, wherein the first substrate comprises a first base, a first electrode on a side of the first base proximal to the dye liquid crystal layer; and the second substrate comprises a second base and a second electrode on a side of the second base proximal to the dye liquid crystal layer; and
    the first electrode and the second electrode are both plate-shaped electrodes.

11. The light-adjusting glass of claim 3, wherein the first substrate comprises a first base and a first electrode on a side of the first base proximal to the dye liquid crystal layer; and the second substrate comprises a second base and a second electrode on a side of the second base proximal to the dye liquid crystal layer; and
    one of the first electrode and the second electrode is a plate-shaped electrode, and the other is a strip-shaped electrode.

12. The light-adjusting glass of claim 2, wherein
    the dye liquid crystal layer further comprises chiral additives;
    the polymer network comprises photo-polymerizable monomers or thermally polymerizable monomers;
    a mass ratio of the chiral additives in the dye liquid crystal layer is 0.2% to 10%; and
    a mass ratio of polymerizable monomers of the polymer network in the dye liquid crystal layer is 1% to 40%.

13. The light-adjusting glass of claim 3, wherein
    the dye liquid crystal layer further comprises chiral additives;
    the polymer network comprises photo-polymerizable monomers or thermally polymerizable monomers;
    a mass ratio of the chiral additives in the dye liquid crystal layer is 0.2% to 10%; and
    a mass ratio of polymerizable monomers of the polymer network in the dye liquid crystal layer is 1% to 40%.

14. A glass assembly, comprising the light-adjusting glass of claim 1.

15. A method for manufacturing the light-adjusting glass of claim 12, comprising steps of:
    uniformly mixing the positive liquid crystal molecules, the dye molecules, the chiral additives, the polymerizable monomers and initiators to form a dye liquid crystal mixture;

forming a first electrode on a first base and forming a first alignment layer on a surface of the first electrode distal to the first base to form the first substrate;

forming a second electrode on a second base and forming a second alignment layer on a surface of the second electrode distal to the second base to form the second substrate;

dripping the dye liquid crystal mixture on one of the first substrate and the second substrate, coating a frame sealant on the other of the first substrate and the second substrate, and aligning and assembling the first substrate and the second substrate to form a dye liquid crystal cell;

curing the frame sealant to adhere the first substrate to the second substrate, while ensuring that the polymerizable monomers in the dye liquid crystal mixture do not react;

applying a voltage to the first electrode and the second electrode to cause the liquid crystal molecules and the dye molecules to be arranged in the plane perpendicular to the first substrate, while the polymerizable monomers are induced by the liquid crystal molecules and the dye molecules to be arranged in the plane perpendicular to the first substrate; performing a polymerization on the dye liquid crystal cell such that the polymerizable monomers in the dye liquid crystal mixture react to form the polymer network and the polymer network is a vertical polymer network arranged parallel to the liquid crystal molecules; and removing the voltage applied to the first electrode and the second electrode, such that the liquid crystal molecules and the dye molecules are restored to be planar spiral, and the polymer network is still in a vertical structure, to obtain the light-adjusting glass in the normally black mode with the vertical polymer network.

16. The method of claim 15, wherein the step of curing the frame sealant to adhere the first substrate to the second substrate, while ensuring that the polymerizable monomers in the dye liquid crystal mixture do not react comprises steps of:

curing the frame sealant to adhere the first substrate to the second substrate by performing a thermal polymerization process, or by using a light shielding part to prevent light from illuminating the polymerizable monomers and then performing a photopolymerization process, wherein the polymerizable monomers are the photo-polymerizable monomers; and curing the frame sealant to adhere the first substrate to the second substrate by performing the photopolymerization process, wherein the polymerizable monomers are the thermally polymerizable monomers.

17. The method of claim 15, wherein the step of uniformly mixing the positive liquid crystal molecules, the dye molecules, chiral additives, the polymerizable monomers and initiators to form a dye liquid crystal mixture comprises steps of:

uniformly mixing dye liquid crystal molecules MDA-18-1670 having a fixed mass ratio of the dye molecules to the liquid crystal molecules, chiral additives ZLI-4571, polymerizable monomers C3M and photoinitiators IRG184 according to a mass ratio of 91.9%/1.5%/6%/0.6%, to form the dye liquid crystal mixture; or uniformly mixing the dye liquid crystal molecules MDA-18-1670 having the fixed mass ratio of the dye molecules to the liquid crystal molecules, chiral additives BPH, polymerizable monomers DGEBF and polymerizable monomers PACM according to a mass ratio of 89.5%/0.5%/5%/5%, to form the dye liquid crystal mixture.

18. A method for manufacturing the light-adjusting glass of claim 13, comprising steps of:

uniformly mixing the negative liquid crystal molecules, the dye molecules, chiral additives, the polymerizable monomers and initiators to form a dye liquid crystal mixture;

forming a first electrode on a first base and forming a first alignment layer on a surface of the first electrode distal to the first base to form the first substrate;

forming a second electrode on a second base and forming a second alignment layer on a surface of the second electrode distal to the second base to form the second substrate;

dripping the dye liquid crystal mixture on one of the first substrate and the second substrate, coating a frame sealant on the other of the first substrate and the second substrate, and aligning and assembling the first substrate and the second substrate to form a dye liquid crystal cell;

curing the frame sealant to adhere the first substrate to the second substrate, while ensuring that the polymerizable monomers in the dye liquid crystal mixture do not react;

applying a voltage to the first electrode and the second electrode to cause the liquid crystal molecules and the dye molecules to be arranged parallel to a surface of the first substrate and be spirally arranged along a spiral axis perpendicular to the surface of the first substrate under an action of the chiral additives to form the polymer network with a uniform planar spiral texture; and removing the voltage applied to the first electrode and the second electrode, such that the liquid crystal molecules and the dye molecules are restored to be arranged perpendicular to the first substrate, and the polymer network is still in a planar spiral structure, to obtain the light-adjusting glass in the normally white mode with the planar spiral polymer network.

19. The method of claim 18, wherein the step of curing the frame sealant to adhere the first substrate to the second substrate, while ensuring that the polymerizable monomers in the dye liquid crystal mixture do not react comprises steps of:

curing the frame sealant to adhere the first substrate to the second substrate by performing a thermal polymerization process, or by using a light shielding part to prevent light from illuminating the polymerizable monomers and then performing a photopolymerization process, wherein the polymerizable monomers are the photo-polymerizable monomers, and curing the frame sealant to adhere the first substrate to the second substrate by performing the photopolymerization process, wherein the polymerizable monomers are the thermally polymerizable monomers.

20. The method of claim 18, wherein the step of uniformly mixing the negative liquid crystal molecules, the dye molecules, chiral additives, the polymerizable monomers and initiators to form a dye liquid crystal mixture comprises steps of:

uniformly mixing dye liquid crystal molecules MDA-18-2219 having a fixed mass ratio of the dye molecules to the liquid crystal molecules, chiral additives CB15, polymerizable monomers C6M, polymerizable monomers DCM and photoinitiators IRG651 according to a mass ratio of 87.5/1.5%/3%/7%/1.0%, to form the dye liquid crystal mixture.

* * * * *